US012163370B2

(12) United States Patent
Sandbrook

(10) Patent No.: US 12,163,370 B2
(45) **Date of Patent: *Dec. 10, 2024**

(54) VEHICLE BARRIER GATE SYSTEM

(71) Applicant: Frogparking Limited, Palmerston North (NZ)

(72) Inventor: Donald H. Sandbrook, Palmerston North (NZ)

(73) Assignee: Frogparking Limited, Palmerston North (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,295

(22) Filed: Sep. 14, 2023

(65) Prior Publication Data

US 2024/0003179 A1 Jan. 4, 2024

Related U.S. Application Data

(63) Continuation of application No. 17/851,250, filed on Jun. 28, 2022, now Pat. No. 11,761,256, which is a (Continued)

(51) Int. Cl.

*E05F 15/00* (2015.01)
*E05F 15/63* (2015.01)
(Continued)

(52) U.S. Cl.

CPC .............. *E05F 15/73* (2015.01); *E05F 15/63* (2015.01); *E06B 11/027* (2013.01); (Continued)

(58) Field of Classification Search

CPC ......... E01F 13/06; E01F 13/048; E01F 13/00; E01F 13/028; E01F 13/04; E01F 13/042; (Continued)

(56) References Cited

U.S. PATENT DOCUMENTS 4,811,516 A 3/1989 Anderson
5,288,164 A 2/1994 Nasatka
(Continued)

OTHER PUBLICATIONS

U.S. Appl. No. 17/989,003, filed Nov. 17, 2022, Donald H. Sandbrook.

*Primary Examiner* — Chi Q Nguyen
(74) *Attorney, Agent, or Firm* — Neustel Law Offices

(57) ABSTRACT

A vehicle barrier gate system which is positioned above a roadway through which vehicles pass. Some of the various embodiments of the present disclosure include a gate comprised of an arm and barrier which is adjustable between a raised position in which a vehicle may pass and a lowered position in which a vehicle is prevented from passing. The gate may be movably connected to a ceiling or an overhead support structure positioned above the roadway. Various types of actuators may be utilized to adjust the gate along a linear and/or angular path between the raised and lowered positions. A control unit may be in communication with one or more sensors and/or an authorization system to control the actuator. The gate may include a breakaway mechanism which allows the gate to be manually raised or lowered in the event of actuator failure or a vehicle ramming through the gate.

20 Claims, 26 Drawing Sheets

Related U.S. Application Data continuation of application No. 17/549,950, filed on Dec. 14, 2021, now Pat. No. 11,377,899.

(51) Int. Cl.
*E05F 15/73* (2015.01)
*E06B 11/02* (2006.01)

(52) U.S. Cl.
CPC ..... *E05Y 2201/434* (2013.01); *E05Y 2201/46* (2013.01); *E05Y 2201/624* (2013.01); *E05Y 2400/40* (2013.01); *E05Y 2400/44* (2013.01); *E05Y 2600/40* (2013.01); *E05Y 2600/626* (2013.01); *E05Y 2800/406* (2013.01); *E05Y 2900/40* (2013.01)

(58) Field of Classification Search
CPC ........ E01F 13/08; E01F 15/63; B65G 69/003; E06B 11/027; E05Y 2201/434; E05Y 2201/46; E05Y 2201/624; E05Y 2400/40; E05Y 2600/626; E05Y 2800/406; E05Y 2900/40
See application file for complete search history.

(56) References Cited

U.S. PATENT DOCUMENTS

| | | | | | |
|---|---|---|---|---|---|
| 5,440,838 | A | | 8/1995 | Lesser | |
| 5,459,963 | A | | 10/1995 | Alexander | |
| 5,649,396 | A | | 7/1997 | Carr | |
| 5,884,432 | A | | 3/1999 | DeLillo | |
| 6,119,397 | A | | 9/2000 | Metz | |
| 6,119,399 | A | | 9/2000 | McCain | |
| 6,460,292 | B1 | * | 10/2002 | Rodriguez | E01F 13/06 49/246 |
| 7,258,461 | B1 | | 8/2007 | Izardel | |
| 7,563,051 | B2 | | 7/2009 | Buckley | |
| 7,814,706 | B2 | * | 10/2010 | Gamache | E01F 13/06 49/9 |
| 8,794,816 | B2 | * | 8/2014 | Kim | F21K 9/232 315/136 |
| 8,794,866 | B2 | | 8/2014 | Petryshyn | |
| 10,907,314 | B2 | | 2/2021 | Satrom | |
| 11,047,099 | B2 | * | 6/2021 | Hosokawa | E01F 13/06 |
| 11,214,934 | B2 | * | 1/2022 | Matthews | E01F 13/12 |
| 11,377,899 | B1 | * | 7/2022 | Sandbrook | E05F 15/63 |
| 11,697,910 | B2 | * | 7/2023 | Wiegel | B65G 69/00 160/293.1 |
| 11,761,256 | B2 | * | 9/2023 | Sandbrook | E06B 11/027 49/31 |
| 11,821,155 | B1 | * | 11/2023 | Sandbrook | E01F 13/06 |
| 2002/0184824 | A1 | * | 12/2002 | McCartney | E05D 13/00 49/322 |
| 2006/0124252 | A1 | | 6/2006 | Miller | |
| 2007/0079942 | A1 | | 4/2007 | Snyder | |
| 2008/0038055 | A1 | | 2/2008 | Jankovsky | |
| 2009/0202296 | A1 | | 8/2009 | Lamore | |
| 2013/0071182 | A1 | | 3/2013 | Younce | |
| 2013/0291455 | A1 | * | 11/2013 | Wiegel | B65G 69/2888 49/31 |
| 2014/0161523 | A1 | | 6/2014 | Ball | |
| 2016/0002870 | A1 | | 1/2016 | Younce | |
| 2017/0336039 | A1 | | 11/2017 | Pikman | |
| 2019/0134808 | A1 | | 5/2019 | Alotaibi | |
| 2021/0002835 | A1 | | 1/2021 | Adler | |
| 2021/0293089 | A1 | | 9/2021 | Shebib Loiselle | |
| 2022/0090337 | A1 | | 3/2022 | Menier | |

* cited by examiner

VEHICLE BARRIER GATE SYSTEM

CROSS REFERENCE TO RELATED APPLICATIONS

The present application claims priority to and is a continuation of U.S. application Ser. No. 17/851,250 filed on Jun. 28, 2022 which issues as U.S. Pat. No. 11,761,256 on Sep. 19, 2023, which is a continuation of U.S. Application Ser. No. 17/549,950 filed on Dec. 14, 2021 which issued as U.S. Pat. No. 11,377,899 on Jul. 5, 2022. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

The described example embodiments in general relate to a vehicle barrier gate system which is positioned above a roadway through which vehicles pass.

Vehicle barrier gates are extremely common to control ingress and egress to/from various parking areas such as parking lots, parking ramps, and the like (e.g. parking lot gates). Various designs of vehicle barrier gates have been around for some time. There are many design variations to overcome issues such as low ceiling heights or constricted spaces. However, these typical barrier gates are installed on the ground or are occasionally wall mounted.

The mounting configuration of existing designs is complicated and expensive, especially since power is usually required. Such complications and expense are exacerbated even more so if the barrier systems are retrofitted at a later date, as opposed to at the time of facility construction. The ground mounting position also puts expensive hardware in a vulnerable position (e.g., on the ground near where a vehicle passes), where it could easily be vandalized or 'crashed' into. Not only is ground mounting far from ideal, but existing barrier gate designs are also typically slow in their operation, with drivers having to impatiently wait until the path is fully unobstructed before they can proceed.

Sensing elements required to detect an approaching or leaving vehicle currently used in conjunction with existing barrier gates are typically in the form of induction loops, which are also installed in the ground in the path of the vehicle. Once again this makes installation expensive and complicated only to result in a sensor in a harsh environment. Furthermore, induction loops are notorious for being unreliable in their detection. Hence, time outs or other fail safes are required to ensure even semi reliable operation. In some instances, sensing elements may not even be used due to their installation cost, with barrier gate actuation based purely on a push button and timing.

SUMMARY

Some of the various embodiments of the present disclosure relate to a vehicle barrier gate system which is positioned above a roadway through which vehicles pass. Some of the various embodiments of the present disclosure include a gate including an arm and a barrier which is adjustable between a raised position in which a vehicle may pass and a lowered position in which a vehicle is prevented from passing. The gate may be movably connected to a ceiling or an overhead support structure positioned above the roadway. Various types of actuators may be utilized to adjust the gate along a linear or angular path between the raised and lowered positions. A control unit may be in communication with one or more sensors, and/or an authorization system, to control the actuator to raise or lower.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

A. Overview

Figure 1:
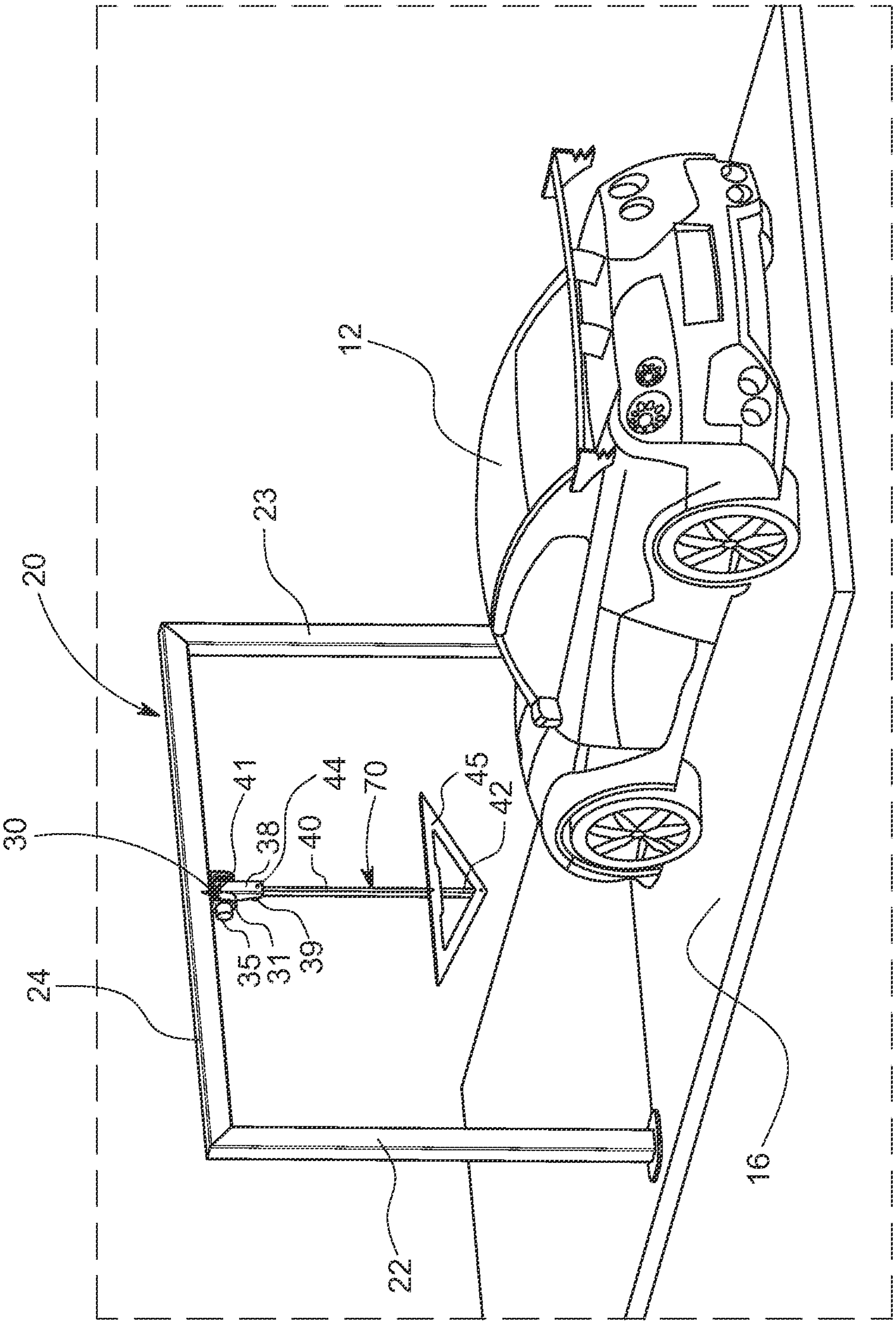
FIG. 1 is a perspective view of a vehicle barrier gate system illustrating a vehicle approaching the vehicle barrier gate system with the gate in the lowered position in accordance with an example embodiment.
Figure 2:
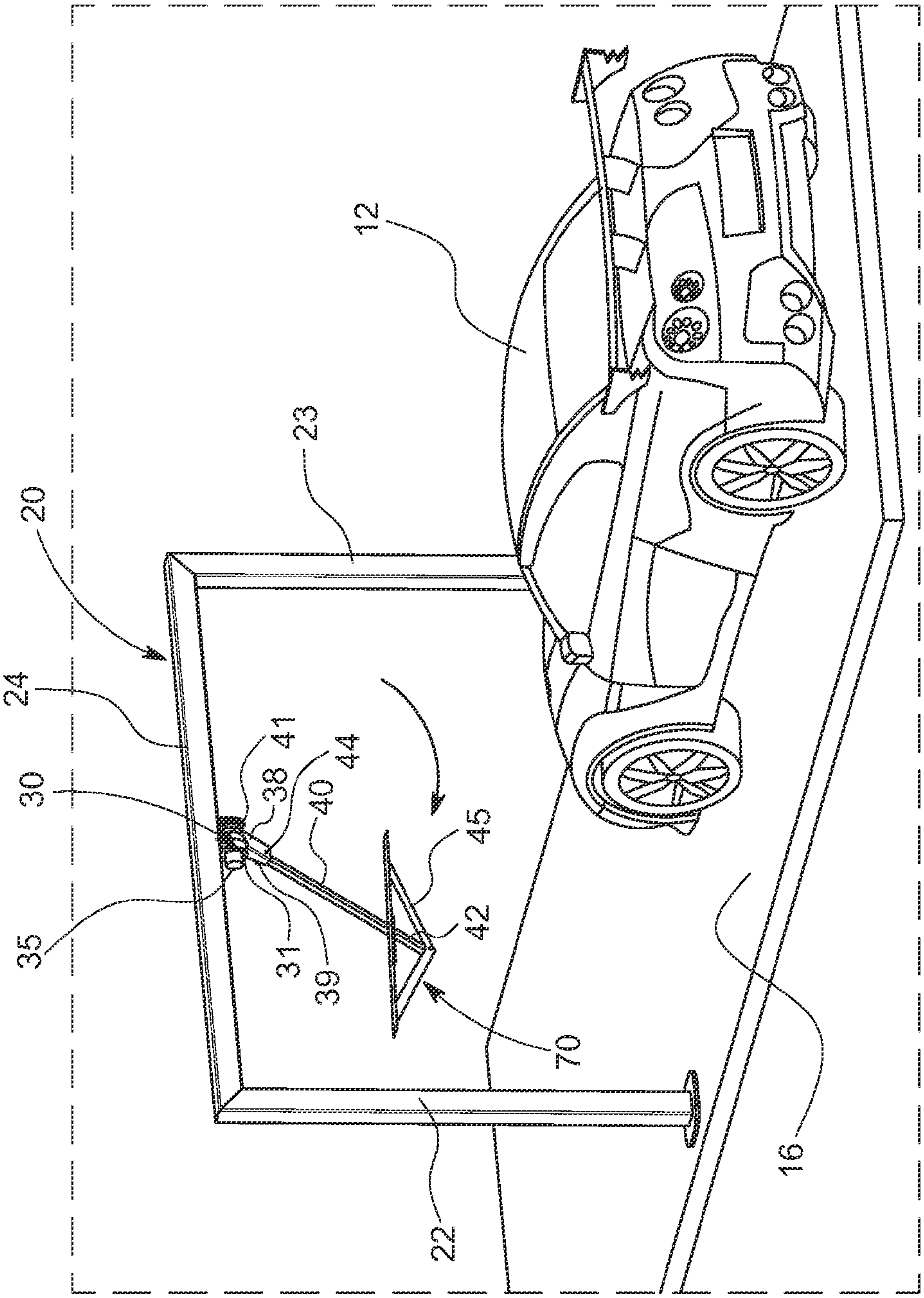
FIG. 2 is a perspective view of a vehicle barrier gate system illustrating a vehicle approaching the vehicle barrier gate system with the gate being raised towards the raised position in accordance with an example embodiment.

Some of the various embodiments of the present disclosure relate to a vehicle barrier gate system which is positioned above a roadway 16 through which vehicles 12 pass, with the vehicle barrier gate system including a gate 70 which is adjustable between a raised position in which a vehicle 12 is permitted to pass underneath the gate 70 and a lowered position in which a vehicle 12 is prevented from passing through the gate 70. The gate 70 may be comprised of an arm 40 and a barrier 45. The barrier 45 may be connected at or near a distal end of the arm 40, or at various other positions along the arm 40. The roadway 16 can be any path that a vehicle 12 passes through including, but not limited to, single-lane and multi-lane roads, inlets and exits for various parking areas such as parking lots, parking ramps, and the like.

In an exemplary embodiment, the vehicle barrier gate system may comprise a mounting bracket 31 adapted to be connected to a ceiling 17. The gate 70 may be movably connected to the mounting bracket 31 and an actuator 35 may be connected to the gate 70. The actuator 35 is adapted to move the gate 70 between a lowered position in which the gate 70 is adapted to prevent passage of a vehicle 12 and a raised position in which the gate is adapted to allow passage of the vehicle 12. A control unit 59 may be in communication with the actuator 35 for controlling the actuator 35. The gate 70 may be adapted to pivot upwardly into the raised position and pivot downwardly into the lowered position. The actuator 35 may be comprised of a motor, with the actuator 35 being adapted to rotate such that the gate 70 is pivoted between the raised position and the lowered position. The actuator 35 may be comprised of a linear actuator, with the gate 70 being adapted to be raised along a vertical, linear path into the raised position and lowered along a vertical, linear path into the lowered position.

A pivoting bracket 38 may be pivotably connected to the actuator 35, with the actuator 35 being adapted to pivot the pivoting bracket 38 and the gate 70 being connected to the pivoting bracket 38. A guide member 36 may be rotatably connected to the mounting bracket 31, with the guide member 36 including an axle 37 to which the gate 70 is connected.

The gate 70 may be removably connected to the pivoting bracket 38, such as by the use of a magnet 39 and a magnetic element 43. For example, the pivoting bracket 38 may include a magnet 39 and the gate 70 may include a magnetic element 43, with the magnet 39 of the pivoting bracket 38 being adapted to magnetically engage with the magnetic element 43 of the gate 70 so as to removably connect the arm 40 to the pivoting bracket 38.

The gate 70 may also be removably connected to the mounting bracket 31, or to an anchoring bracket 32 connected to the mounting bracket 31. The mounting bracket 31 may include a magnet 33, with the magnet 33 of the mounting bracket 31 being adapted to magnetically engage with the magnetic element 43 of the gate 70 when the gate 70 is in the raised position.

The control unit 59 may be in communication with an authorization system 58 that may be in communication with license plate recognition 80, a user terminal 82, mobile devices 84, and/or the like, with the control unit 59 being configured to control the actuator 35 to move the gate 70 into the raised position based on authorization from the authorization system 58. For example, the control unit 59 may be configured to direct the actuator 35 to move the gate 70 into the raised position when the authorization system 58 confirms the vehicle 12 may pass based on information from the user terminal 82. Alternatively or additionally, one or more sensors 50, 55 may be in communication with the control unit 59, with the sensor(s) 50, 55 being adapted to detect the vehicle 12 approaching the gate 70 and the control unit 59 being configured to control the actuator 35 to move the gate 70 into the raised position when the sensor(s) 50, 55 detects the vehicle 12 approaching the gate 70 and to move the gate 70 into the lowered position when the sensor(s) 50, 55 detect the vehicle 12 departing the gate 70. The sensor(s) 50, 55 may be positioned over a path of travel of the vehicle 12 (e.g., a roadway 16), with the sensor(s) 50, 55 being oriented downwardly or angularly-downwardly towards the roadway 16.

In some embodiments, a pair of sensors 50, 55 may be utilized including an entry sensor 50 and an exit sensor 55. The entry sensor 50 may be adapted to detect a vehicle 12 approaching the gate 70 and the exit sensor 55 may be adapted to detect a vehicle 12 departing the gate 70. The control unit 59 may be configured to control the actuator 35 to move the gate 70 into the raised position when the entry sensor 50 detects a vehicle 12 approaching gate 70 and to move the gate 70 into the lowered position when the exit sensor 55 detects the vehicle 12 departing the gate 70. In some embodiments, a single sensor 50 may perform both functions.

In another exemplary embodiment of a vehicle barrier gate system, the gate 70 may be movably connected to an overhead support structure 20 such as a free-standing structure. The overhead support structure 20 may include a first vertical support member 22, a second vertical support member 23, and a horizontal support member 24 connected between the first and second vertical support members 22, 23. The gate 70 may be movably connected to the horizontal support member 24 of the overhead support structure 20. A mounting bracket 31 may be connected to the overhead support structure 20, with the gate 70 being movably connected to the mounting bracket 31.

In yet another exemplary embodiment of a vehicle barrier gate system, a mounting bracket 31 may be adapted to be connected to a ceiling 17 or an overhead support structure 20. An anchoring bracket 32 may be connected to the mounting bracket 31, with the anchoring bracket 32 including a magnet 33. A guide member 36 may be rotatably connected to the mounting bracket 31, with the guide member 36 including an axle 37. A gate 70 comprising an arm 40 and a barrier 45 may be connected to the axle 37, with the arm 40 being connected to the axle 37 of the guide member 36. The arm 40 of the gate 70 may include a magnetic element 43. The barrier 45 may be connected to the arm 40. An actuator 35 comprised of a motor may be rotatably connected to the mounting bracket 31, and a pivoting bracket 38 may be connected to the motor.

The pivoting bracket 38 may include a magnet 39, with the arm 40 being removably connected to the pivoting bracket 38 by the magnetic element 43 of the arm 40 and the magnet 39 of the pivoting bracket 38. The magnetic element 43 of the arm 40 may be adapted to magnetically engage with the magnet 39 of the pivoting bracket 38 so as to removably connect the arm 40 to the pivoting bracket 38. A control unit 59 may be in communication with the actuator 35 for controlling the actuator 35, with the actuator 35 being adapted to pivot the pivoting bracket 38 and the arm 40 between a lowered position in which the gate 70 is adapted to prevent passage of a vehicle 12 and a raised position in which the gate 70 is adapted to allow passage of the vehicle 12. The magnet 33 of the anchoring bracket 32 may be adapted to magnetically engage with the magnetic element 43 of the arm 40 when the gate 70 is in the raised position.

B. Overhead Support Structure

As best shown in FIGS. 1-6, 9, and 10, the vehicle barrier gate system may include an overhead support structure 20 to which the gate 70 is movably connected such that the gate 70 may be moved between a raised position in which a vehicle 12 is permitted to pass under the overhead support structure 20 and a lowered position in which a vehicle 12 is prevented from passing under the overhead support structure 20.

The shape, size, and configuration of the overhead support structure 20 may vary in different embodiments. The overhead support structure 20 may comprise a free-standing structure as shown in the figures. In other embodiments, the overhead support structure 20 may be connected to a ceiling 17, such as in a parking garage. In the embodiment shown in the figures, the overhead support structure 20 is illustrated as comprising a free-standing structure which is connected to the roadway 16.

The height and width of the overhead support structure 20 may vary in different embodiments to suit different roadways, areas, and vehicles. For example, an overhead support structure 20 positioned within a parking garage having a lower ceiling 17 will be of a lesser height than an overhead support structure 20 positioned on an open roadway 16 that may need to accommodate taller vehicles such as trucks.

In the exemplary embodiment shown in FIGS. 1-6, it can be seen that an exemplary embodiment of an overhead support structure 20 may comprise a frame formed by first vertical support member 22, a second vertical support member 23, and a horizontal support member 24 connected between the first vertical support member 22 and the second vertical support member 23. The first and second vertical support members 22, 23 are each anchored on either side of the roadway 16, with the horizontal support member 24 extending across and above the roadway 16.

Figure 21:
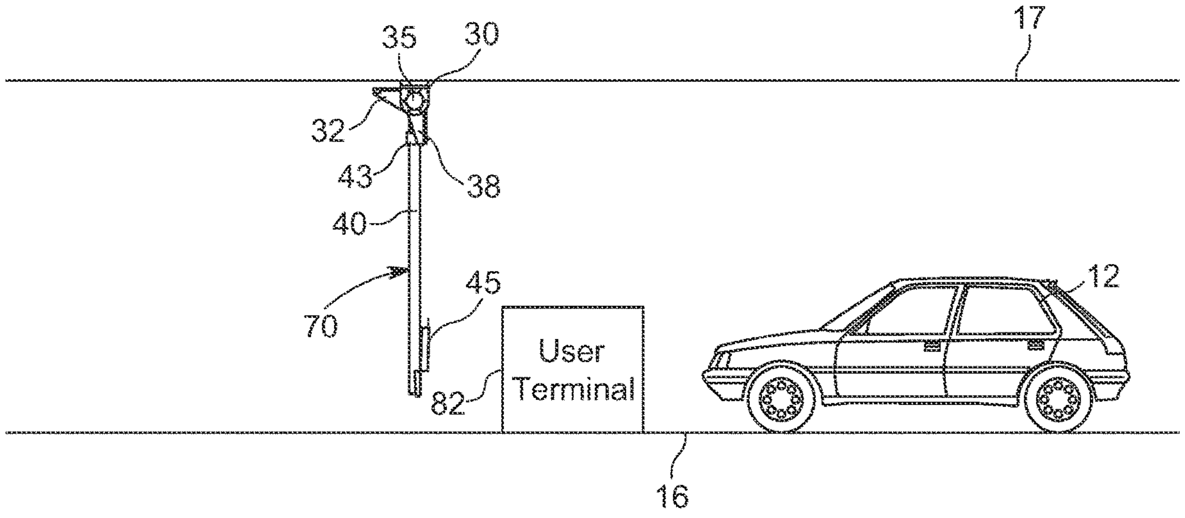
FIG. 21 is a side view of a vehicle approaching a vehicle barrier gate system connected to a ceiling including a user terminal with the gate in the lowered position in accordance with an example embodiment.

It should be appreciated that, in some embodiments, the overhead support structure 20 may only comprise the horizontal support member 24 such as, for example, in an embodiment in which a horizontal support member 24 is connected between a pair of opposing walls. In other embodiments, such as shown in FIG. 21, the overhead support structure 20 may be omitted entirely, with the mounting bracket 31 being connected directly to a ceiling 17 (e.g., in a parking garage).

As best shown in FIGS. 1-6, a lifting mechanism 30 and mounting bracket 31 may be connected to the overhead support structure 20 such that the gate 70 extends downwardly to selectively block the roadway 16 over which the overhead support structure 20 is positioned. The positioning of the lifting mechanism 30 and mounting bracket 31 may vary in different embodiments. In the exemplary embodiment shown in the figures, the lifting mechanism 30 and mounting bracket 31 are connected to the horizontal support member 24 at the approximately mid-point between the first and second vertical support members 22, 23.

In some embodiments, the lifting mechanism 30 and mounting bracket 31 may instead be positioned at various other locations along the length of the horizontal support member 24. In some embodiments, multiple lifting mechanisms 30 and mounting brackets 31 may be secured to the same overhead support structure 20 (e.g., to support a first gate for entry and a second gate 70 for exit).

C. Lifting Mechanism

As shown throughout the figures, the vehicle barrier gate system may utilize a lifting mechanism 30 for raising and lowering the gate 70. The lifting mechanism 30 is generally connected to an overhead mounting point, such as a ceiling 17 or overhead support structure 20, by a mounting bracket 31. However, it should be appreciated that the manner by which the lifting mechanism 30 is connected to such an overhead mounting point may vary in different embodiments. In some embodiments, a discrete mounting bracket 31 may be omitted.

In the exemplary embodiment best shown in FIGS. 1-8D and 12A-12D, it can be seen that the mounting bracket 31 may comprise an inverted U-shaped member including a horizontal member with a pair of sidewalls extending downwardly from the respective ends thereof. The embodiment illustrated in the figures is merely an exemplary embodiment, and should not be construed as limiting in scope, as various other types of mounting brackets 31 (or no mounting bracket 31 at all) may be utilized with the various embodiments of the vehicle barrier gate system shown and described herein.

As best shown in FIGS. 1-5 and 13-19C, a gate 70 may be movably connected to the mounting bracket 31 such that the gate 70 may move with respect to the mounting bracket 31. More specifically, the embodiment shown in FIGS. 1-6 illustrates an arm 40 of the gate 70 which is pivotably connected to the mounting bracket 31. An actuator 35 is illustrated for moving the arm 40, with the actuator 35 illustrated as being connected to the mounting bracket 31.

It should be appreciated, however, that in some embodiments, the actuator 35 may not be connected to the mounting bracket 31, but instead be connected adjacent to the mounting bracket 31 (e.g., by being connected to the overhead support structure 20 or a ceiling 17). It should also be appreciated that, in some embodiments, the gate 70 itself may be directly connected not to a mounting bracket 31, but to the overhead support structure 20 or a ceiling 17.

Figure 12A:
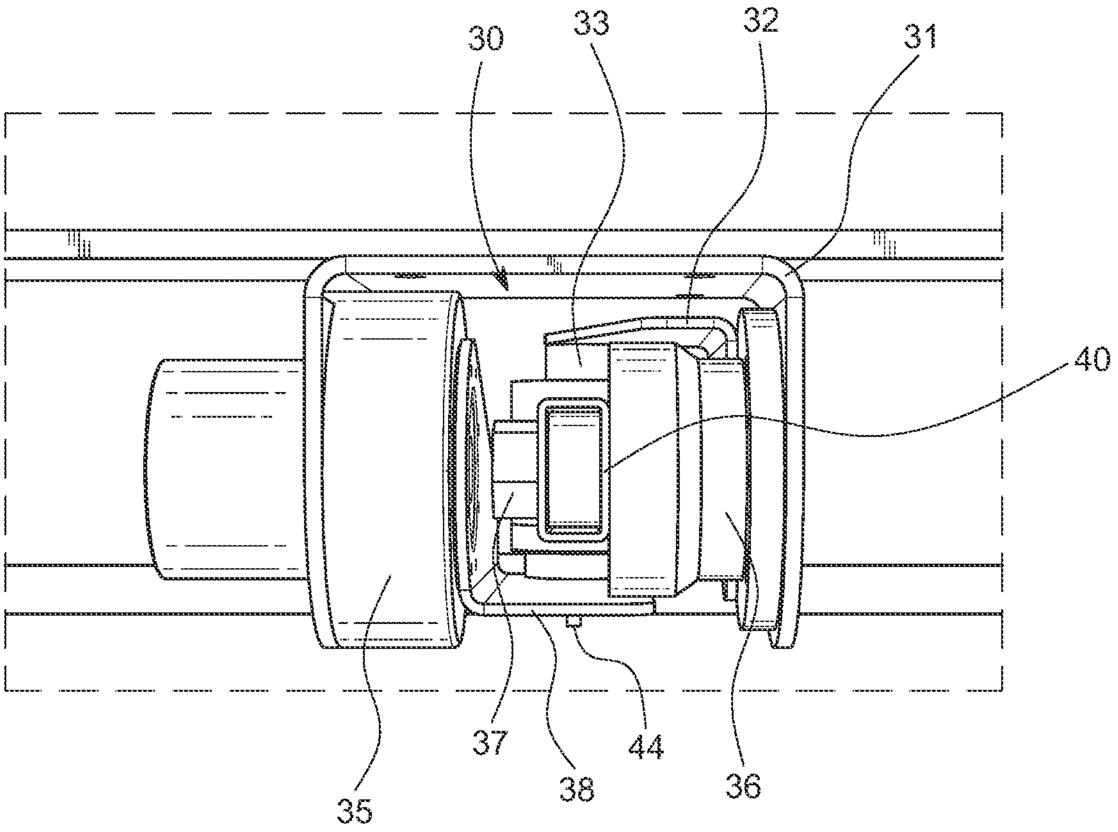
FIG. 12A is a front end view of a lifting mechanism of a vehicle barrier gate system with the gate in the raised position in accordance with an example embodiment.
Figure 12B:
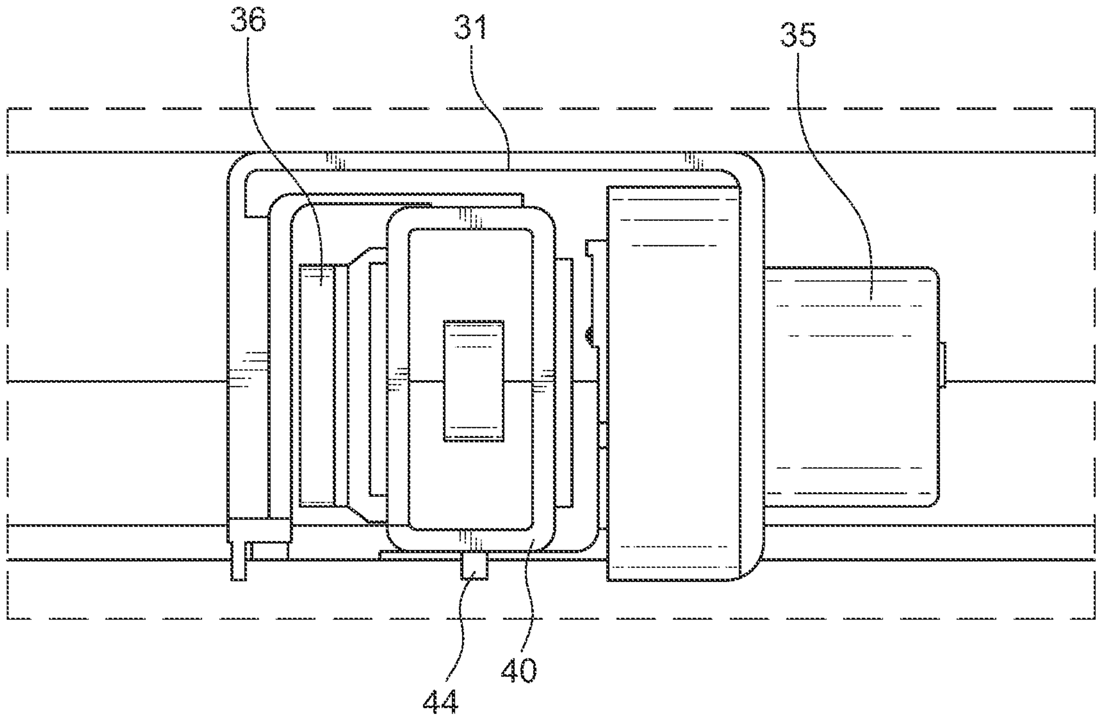
FIG. 12B is a rear end view of a lifting mechanism of a vehicle barrier gate system with the gate in the raised position in accordance with an example embodiment.
Figure 12C:
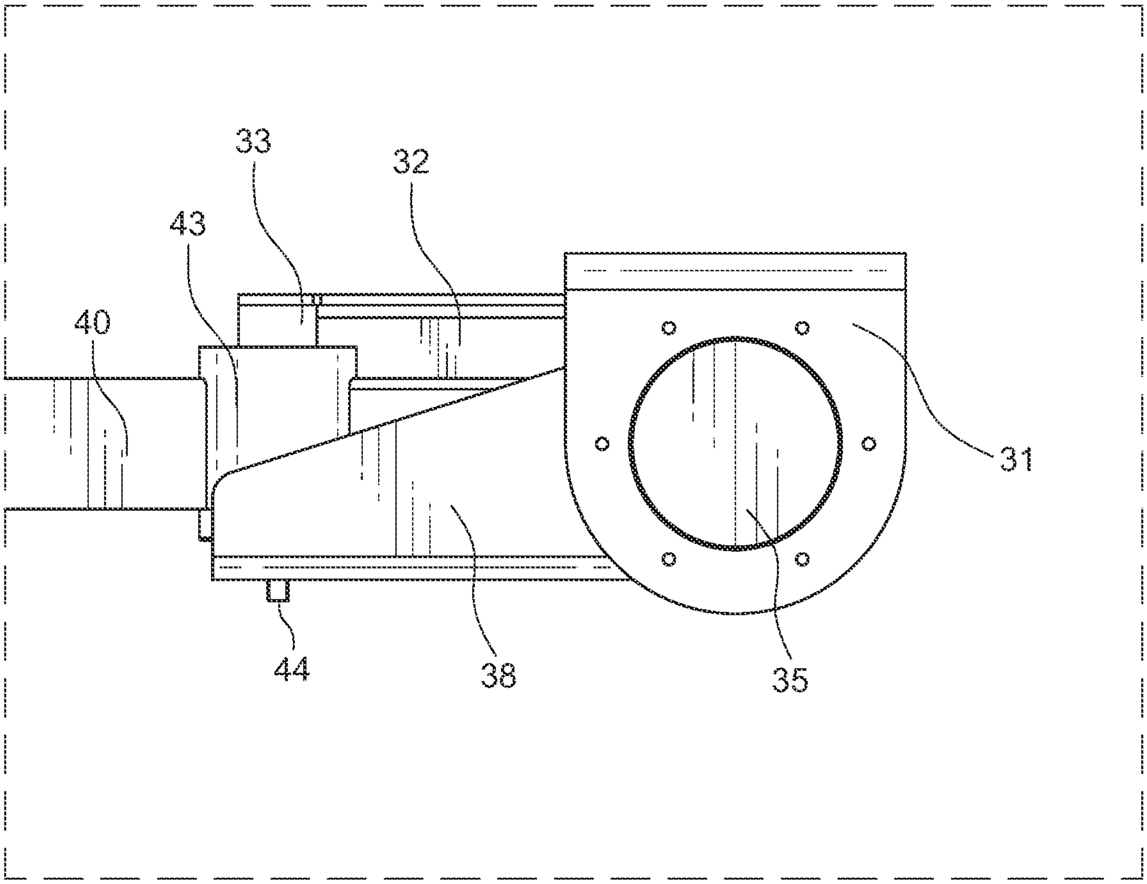
FIG. 12C is a first side view of a lifting mechanism of a vehicle barrier gate system with the gate in the raised position in accordance with an example embodiment.
Figure 13:
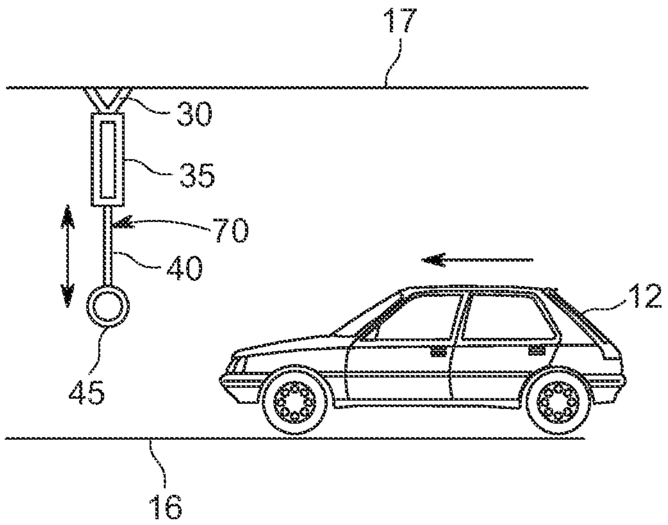
FIG. 13 is a side view of a vehicle barrier gate system with the gate in a lowered position in accordance with an example embodiment.
Figure 14:
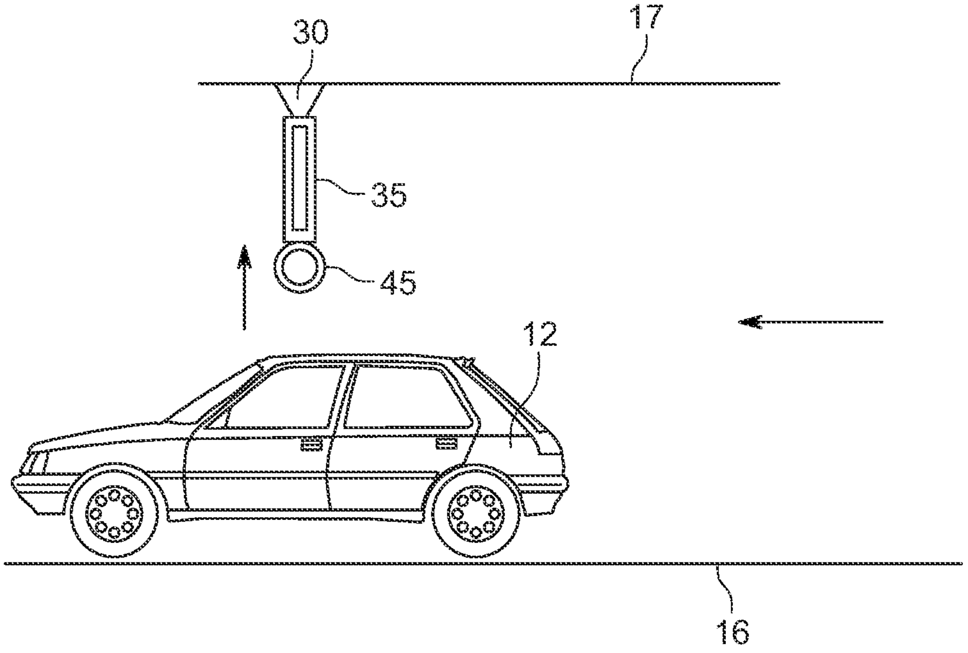
FIG. 14 is a side view of a vehicle barrier gate system with the gate in a raised position in accordance with an example embodiment.

Various types of actuators 35 may be utilized to adjust the gate 70 between the raised and lowered positions. The exemplary embodiments shown in FIGS. 7-12D and 15-19C illustrate usage of an actuator 35 comprised of a motor which rotates so as to angularly pivot the gate 70 between the raised and lowered positions. The exemplary embodiment shown in FIGS. 13 and 14 illustrates usage of an actuator 35 comprised of linear actuator such as an electrical linear actuator, winch, or the like which adjusts the gate 70 linearly (e.g., vertically up into the raised position and vertically down into the lowered position).

In the exemplary embodiments shown in FIGS. 1-12D, the actuator 35 comprises a motor which rotates so as to pivot the gate 70 along an angular path. The motor may comprise an electric motor including a stator and a rotor. The actuator 35 may be connected to the mounting bracket 31. The rotor may extend through the mounting bracket 31. A pivoting bracket 38 may be connected to the rotating portion (e.g., the rotor) of the actuator 35, such that rotation of the actuator 35 imparts rotational force to cause the pivoting bracket 38 to pivot angularly in two directions.

Figure 5:
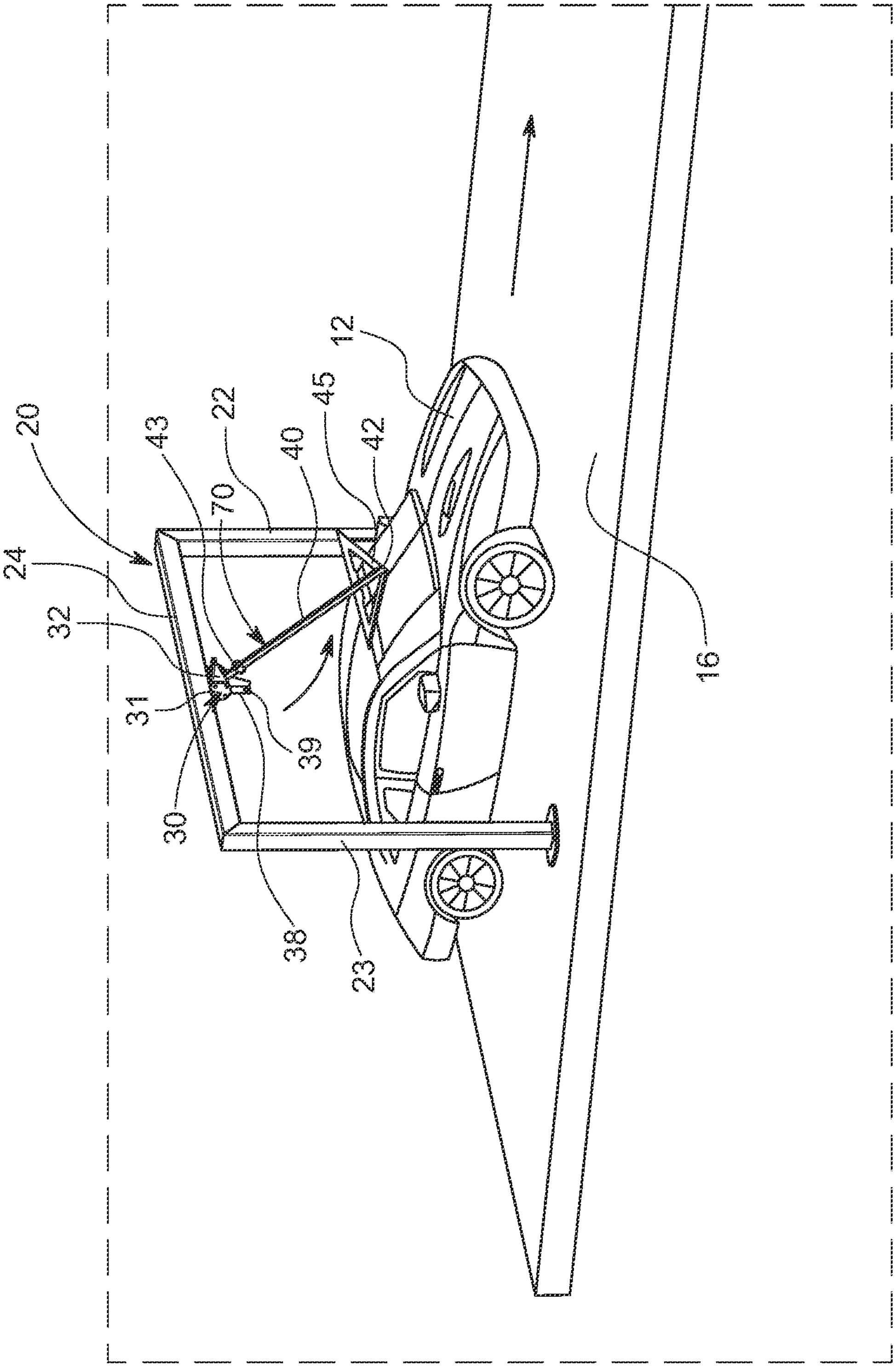
FIG. 5 is a perspective view of a vehicle barrier gate system illustrating a vehicle breaking through the vehicle barrier gate system in accordance with an example embodiment.

The shape and structure of the pivoting bracket 38 may vary in different embodiments. In the exemplary embodiment shown in the figures, the pivoting bracket 38 may comprise an L-shaped cross-section so as to support the gate 70. The gate 70 may be removably connected to the pivoting bracket 38 such that the gate 70 may disengage from the pivoting bracket 38 when forced (e.g., when a vehicle 12 crashes through the gate 70 such as shown in FIG. 5). Such a configuration functions as a breakaway mechanism to prevent damage to the gate 70 (e.g., fracturing the arm 40 and/or barrier 45) if a vehicle 12 attempts to crash or ram through the gate 70 prior to the gate 70 being raised into the raised position. Various other types of breakaway mechanisms may be utilized, such as a spring-loaded clutch, magnetic catch, or the use of electronic motor control or the like.

As shown in FIGS. 8A-12D, the pivoting bracket 38 is adapted to pivot between a lowered position in which the pivoting bracket 38 is perpendicular to the roadway 16 and a raised position in which the pivoting bracket 38 is parallel to the roadway 16. Rotation of the actuator 35 to which the pivoting bracket 38 is connected functions to pivot the pivoting bracket 38 (and the gate 70) between the raised and lowered positions. The manner by which the actuator 35 is connected to the pivoting bracket 38 may vary in different embodiments, including but not limited to the usage of fasteners, welding, and the like.

Figure 8A:
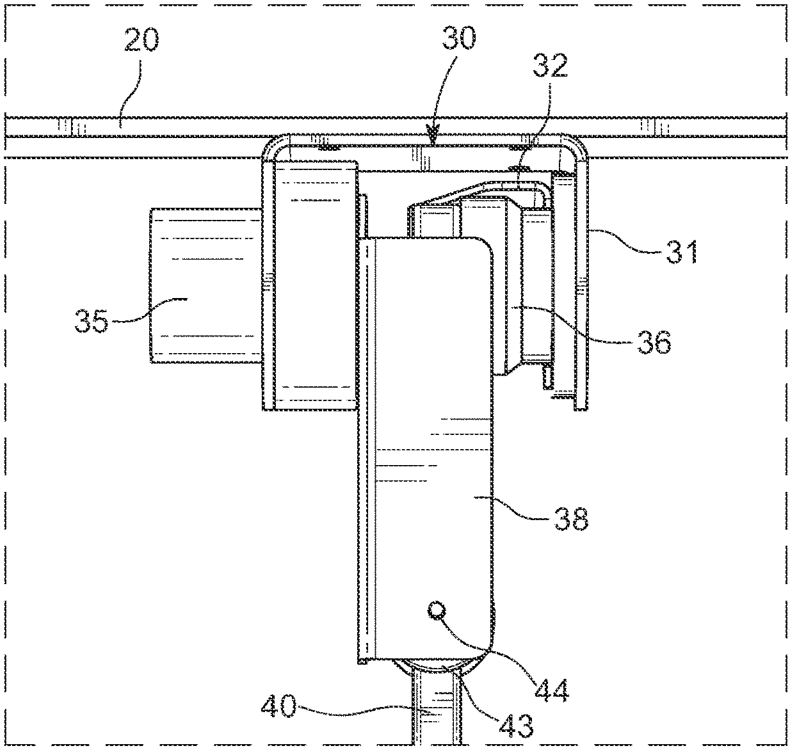
FIG. 8A is a front end view of a lifting mechanism of a vehicle barrier gate system with the gate in the lowered position in accordance with an example embodiment.
Figure 8B:
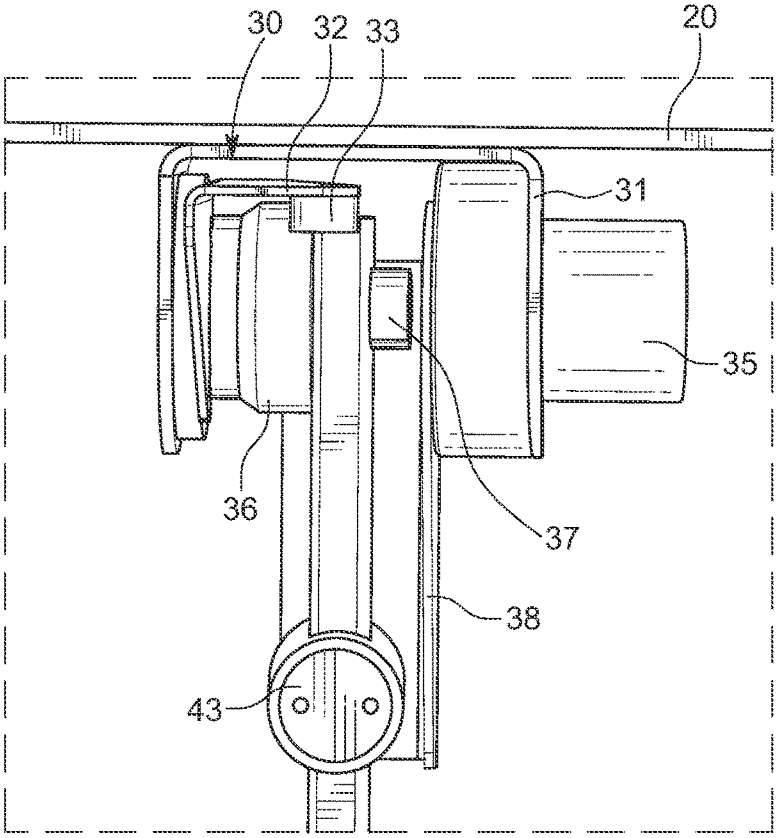
FIG. 8B is a rear end view of a lifting mechanism of a vehicle barrier gate system with the gate in the lowered position in accordance with an example embodiment.
Figure 8C:
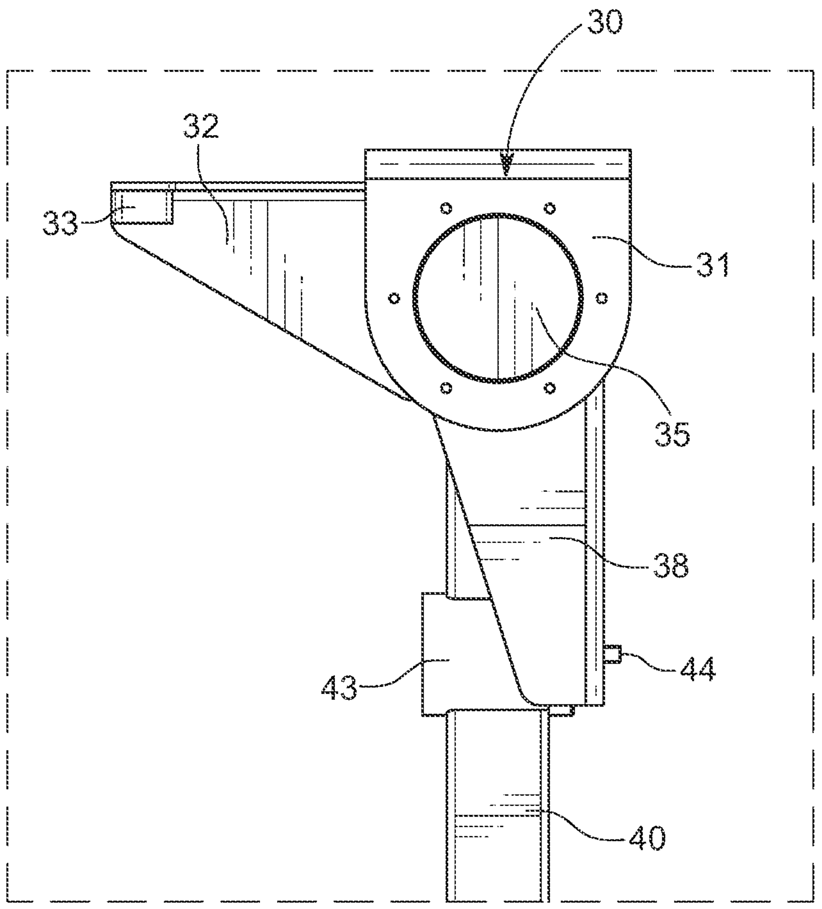
FIG. 8C is a first side view of a lifting mechanism of a vehicle barrier gate system with the gate in the lowered position in accordance with an example embodiment.
Figure 8D:
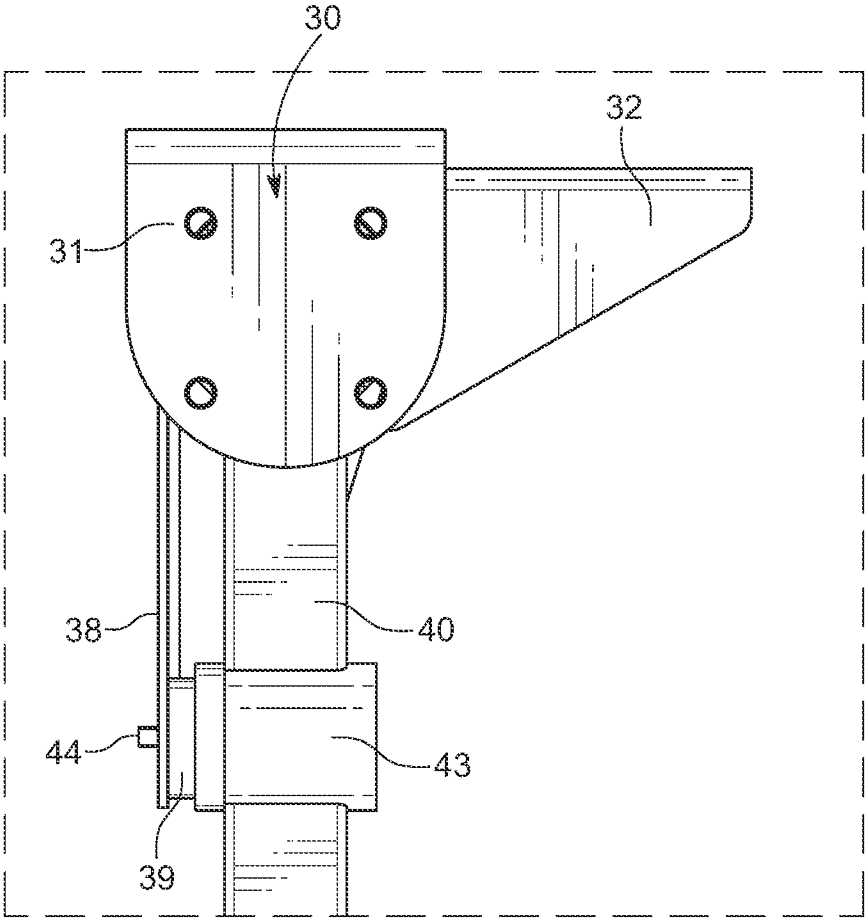
FIG. 8D is a second side view of a lifting mechanism of a vehicle barrier gate system with the gate in the lowered position in accordance with an example embodiment.
Figure 9:
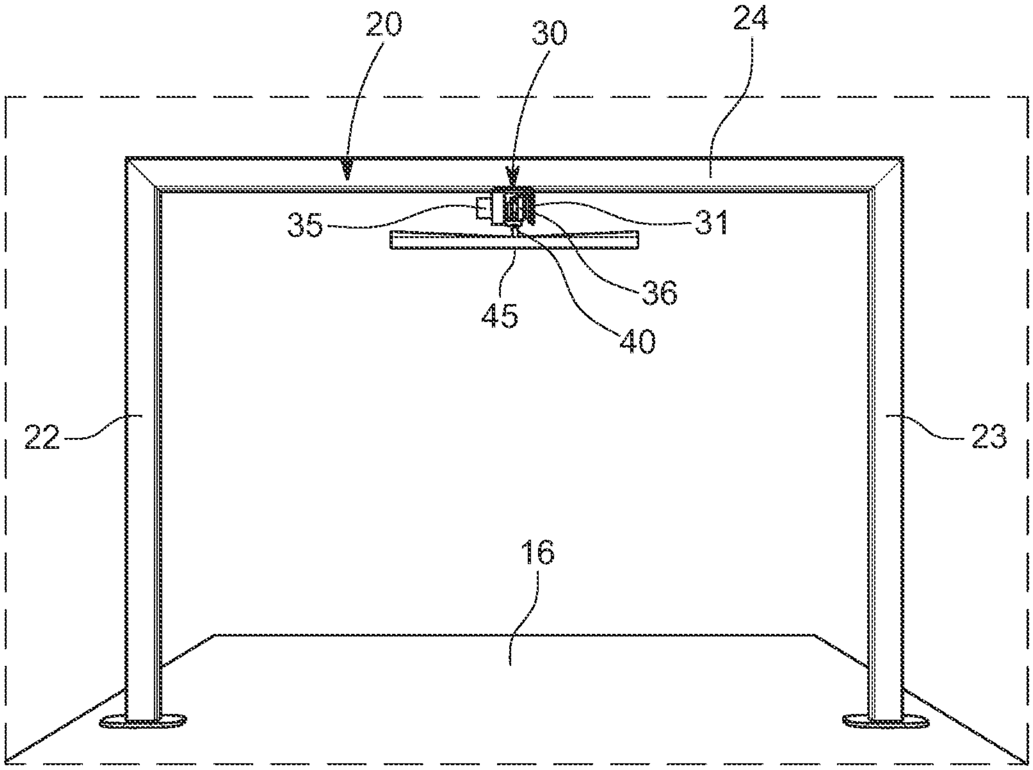
FIG. 9 is a front end view of a vehicle barrier gate system with the gate in the raised position in accordance with an example embodiment.
Figure 10:
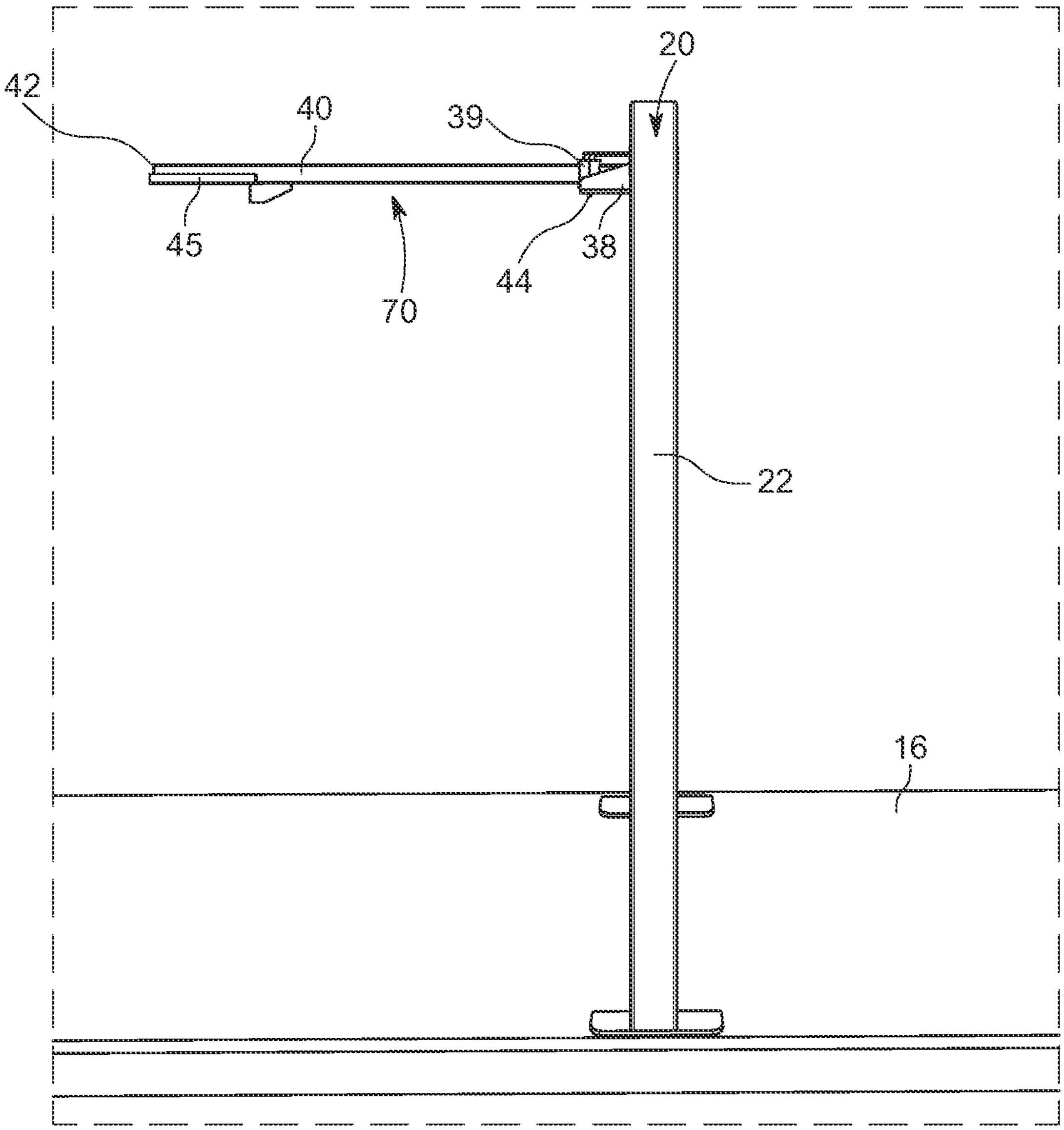
FIG. 10 is a side view of a vehicle barrier gate system with the gate in the raised position in accordance with an example embodiment.
Figure 11:
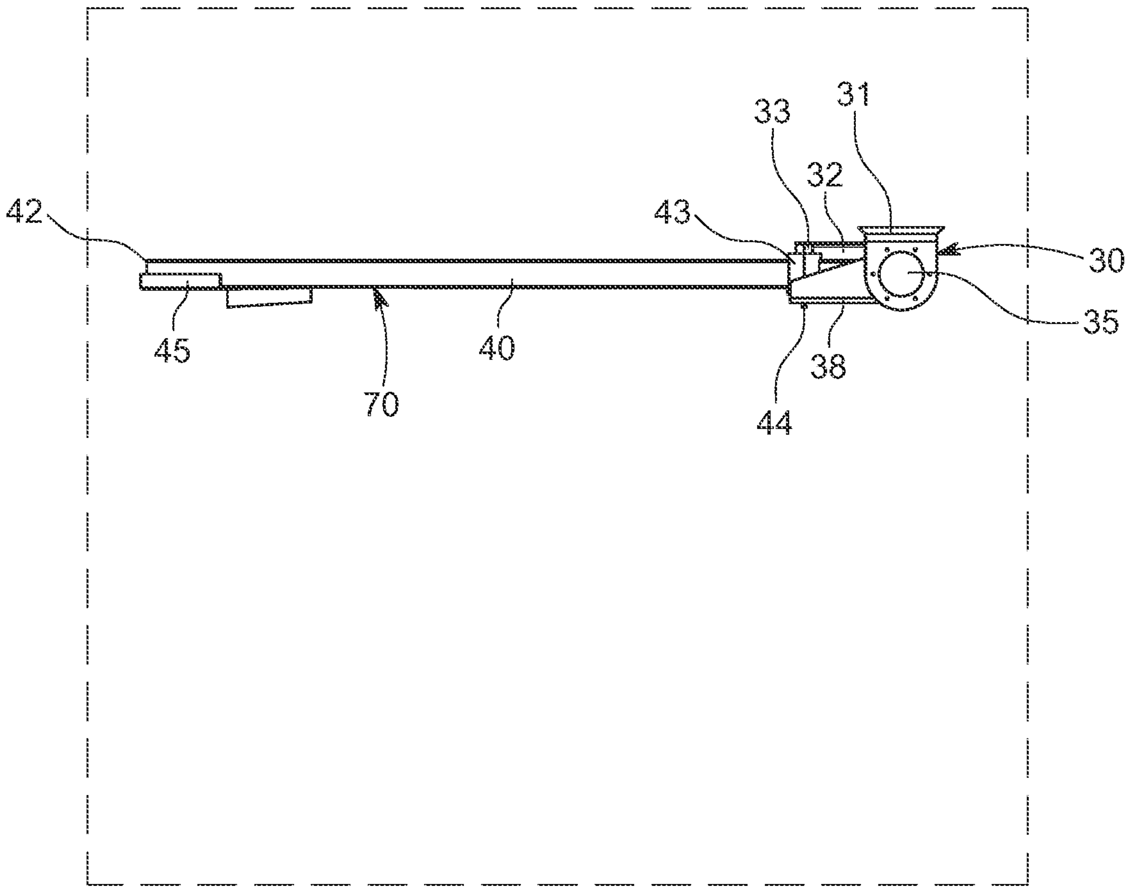
FIG. 11 is a side view of a vehicle barrier gate system with the gate in the raised position in accordance with an example embodiment.
Figure 12D:
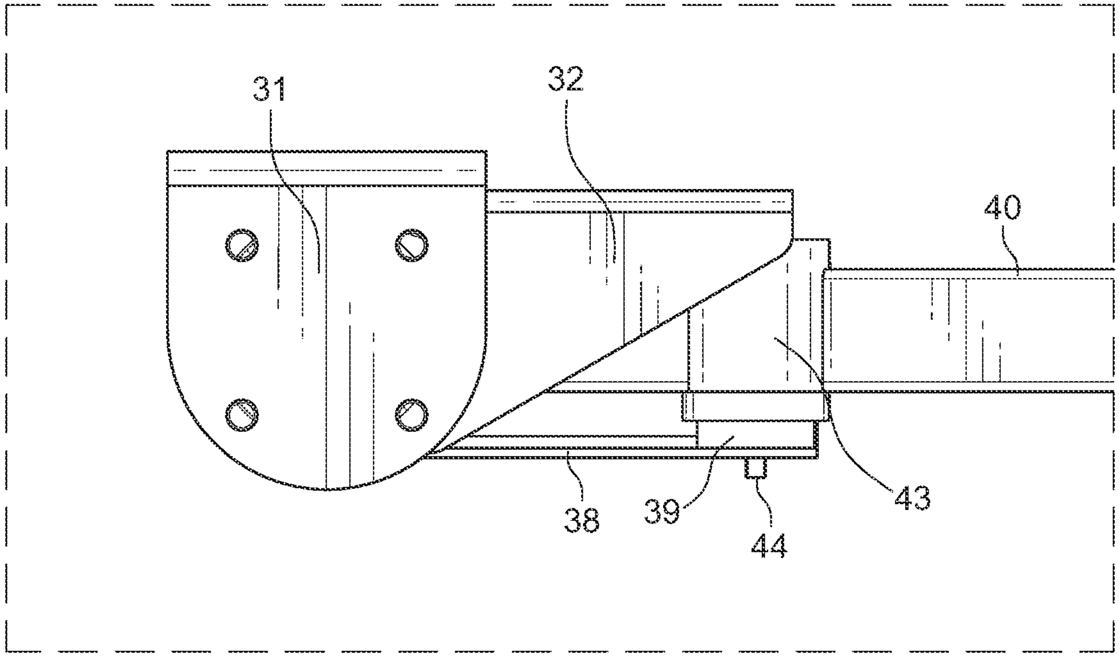
FIG. 12D is a second side view of a lifting mechanism of a vehicle barrier gate system with the gate in the raised position in accordance with an example embodiment.

As best shown in FIGS. 8D and 12D, the pivoting bracket 38 may include a magnet 39 to aid in removably securing the gate 70 to the pivoting bracket 38. In the figures, the magnet 39 is illustrated as comprising a disc-shaped magnet 39 which may be secured to the pivoting bracket 38 by a fastener 44. However, it should be appreciated that various different types and shapes of magnets 39 may be utilized in different embodiments. In some embodiments, the magnet 39 may comprise an electromagnet. In other embodiments, the magnet 39 may comprise a permanent or temporary magnet 39. The magnet 39 may in some embodiments be comprised of a plate, or various other shapes known in the art.

The magnet 39 is adapted to magnetically engage with a corresponding magnetic element 43 connected to the gate 70 so as to removably connect the gate 70 to the pivoting bracket 38 such as shown in FIGS. 8D and 12D. During normal operation, the magnet 39 of the pivoting bracket 38 remains magnetically engaged with the magnetic element 43 of the gate 70 when the gate 70 is in both the raised and lowered positions.

In some situations, the magnets 39 and magnetic element 43 may disengage from each other. As a first example, if the gate 70 needs to be manually raised (e.g., in the event of failure of the actuator 35 due to power loss or the like), an individual may simply force the gate 70 to pivot upwardly, which will cause the magnetic element 43 of the gate 70 to disengage from the magnet 39 of the pivoting bracket 38, thus separating the gate 70 from the pivoting bracket 38 and allowing the gate 70 to be freely adjusted independent of the actuator 35 and the pivoting bracket 38.

Figure 6:
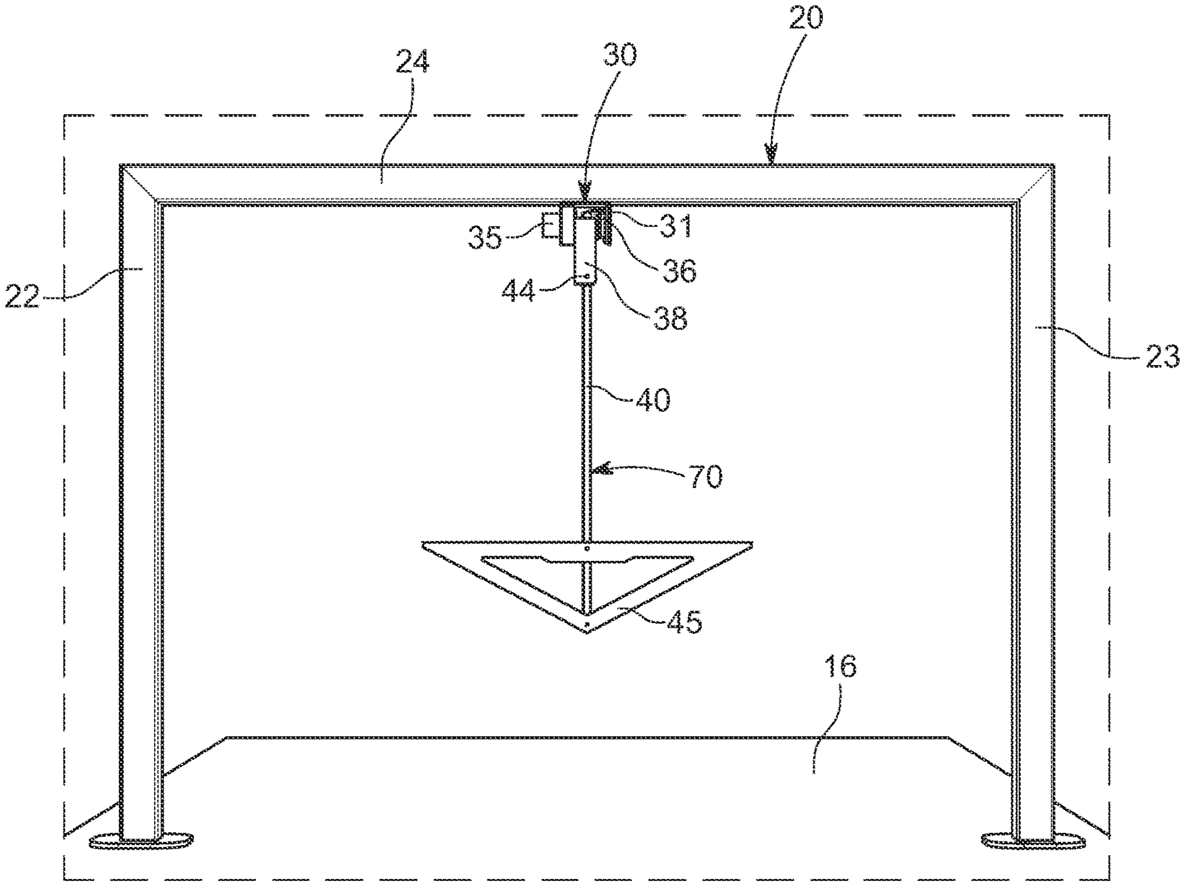
FIG. 6 is a front end view of a vehicle barrier gate system with the gate in the lowered position in accordance with an example embodiment.
Figure 7:
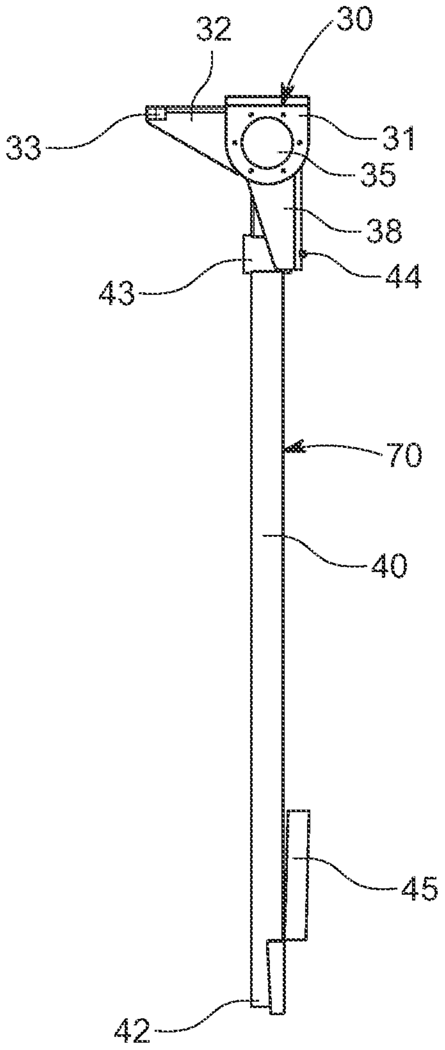
FIG. 7 is a side view of a vehicle barrier gate system with the gate in the lowered position in accordance with an example embodiment.

As another example, the use of the magnet 39 and magnetic element 43 allows the gate 70 to break away from the pivoting bracket 38 without damaging the gate 70 in the event that a vehicle 12 crashes through the gate 70 prior to the gate 70 being raised. Such a situation is illustrated in FIG. 6, in which it can be seen that a vehicle 12 is passing through the gate 70 prior to the gate 70 being raised. The magnetic element 43 of the gate 70 disengages from the magnet 39 of the pivoting bracket 38 so that the gate 70 may freely pivot upwardly to allow passage of the vehicle 12 without damaging the gate 70 or the pivoting bracket 38. Upon the vehicle 12 passing, the gate 70 will naturally pivot back downwardly into its lowered position due to force of gravity, and the magnets 39 will engage with the magnetic element 43.

As best shown in FIGS. 8A-8D and 12A-12D, it can be seen that an anchoring bracket 32 may be connected to the mounting bracket 31. The anchoring bracket 32 may comprise a bracket including an L-shaped or inverted U-shaped configuration which extends parallel to the roadway 16 at the upper terminus of the pivoting path of the gate 70. The anchoring bracket 32 functions as a stopper to stop further upward pivoting of the gate 70 when the gate 70 is parallel to the roadway 16.

The anchoring bracket 32 may also function to retain the gate 70 in the raised position, particularly in situations where the actuator 35 may not be functioning. In this manner, the gate 70 may be removably connected to the anchoring bracket 32 when the gate 70 is in the raised position such as shown in FIGS. 3 and 9-11, independent of the functionality of the actuator 35 to retain the gate 70 in the raised position.

The anchoring bracket 32 may also function to retain the gate 70 in the raised position when the gate 70 is manually raised (as opposed to being raised by the actuator 35). In such a situation as has been previously described, an individual may grasp the gate 70 and manually pivot the gate 70 upwardly, with the gate 70 disengaging from the pivoting bracket 38, until the gate 70 removably connects with the anchoring bracket 32.

The manner by which the gate 70 is removably connected to the anchoring bracket 32 may vary in different embodiments. In some embodiments, clasps, fasteners, and the like may be utilized to removably connect the arm 40 of the gate 70 to the anchoring bracket 32 when the gate 70 is pivoted upwardly to contact the anchoring bracket 32. As an example, a male/female mating connector may be utilized, such as a pin and socket.

In the exemplary embodiment shown in the figures, it can be seen that a magnets 33 and magnetic element 43 may be utilized to removably connect the gate 70 to the anchoring bracket 32 when the gate 70 reaches the upper terminus of its pivoting path. In such an embodiment, the anchoring bracket 32 may include a magnet 33 which is oriented downwardly. The gate 70 may include a corresponding magnetic element 43 which is positioned to align with the magnet 33 of the anchoring bracket 32 when the gate 70 is in the raised position. Thus, when the gate 70 is raised, the magnetic element 43 of the gate 70 will magnetically engage with the corresponding magnet 33 of the anchoring bracket 32.

It should be appreciated that one or more of the magnets 33, 39 discussed herein may be replaced with a magnetic element such as various metals including but not limited to iron. It should also be appreciated that the magnetic element 43 may, in some embodiments, be comprised of a magnet. In one example embodiment, the magnetic element 43 of the gate 70 may be comprised of a magnetic metal, with the magnets 33, 39 of the anchoring and pivoting brackets 32, 38 being comprised of permanent magnets or electromagnets. As another example, the magnets 33, 39 of the anchoring and pivoting brackets 32, 38 may be replaced with a magnetic element such as a magnetic metal, with the magnetic element 43 of the gate 70 being comprised of a permanent magnet or electromagnet.

As best shown in FIGS. 8A, 8B, 12A, and 12B, the gate 70 may be connected to a guide member 36 which guides the gate 70 along its arced, pivoting path between the raised and lowered positions. The guide member 36 may function to smoothen and guide the path of the gate 70 between its positions along a predefined arc.

In the exemplary embodiment shown in the figures, the guide member 36 may comprise a rotor which is rotatably connected to the mounting bracket 31 opposite to the actuator 35. In some embodiments, the guide member 36 may comprise a disc-shaped member which is fixed to the mounting bracket 31 but includes a bearing and axle 37 which rotates with respect to the disc-shaped member.

As best shown in FIGS. 8B and 12B, the gate 70 may be connected to the rotatable portion of the guide member 36 (e.g., to the axle 37 of the guide member 36). The axle 37 may be freely rotatable, with the gate 70 being pivoting about the guide member 36. In such an embodiment, the actuator 35 controls the pivoting motion of the gate 70, with the guide member 36 functioning to guide the gate 70 along its angular, pivoting path.

D. Gate

As shown throughout the figures, the vehicle barrier gate system generally includes a gate 70 which is adjustable between a raised position in which a vehicle 12 may freely pass thereunder and a lowered position in which a vehicle 12 is prevented from passing. As shown in FIGS. 1-4 and 19A-19C, the gate 70 may be pivoted along an angular arc path between the raised and lowered positions. In other embodiments such as shown in FIGS. 13 and 14, the gate 70 may be raised/lowered along a linear path between the raised and lowered positions.

As best shown in FIGS. 1-5, the gate 70 may be comprised of an arm 40 and a barrier 45. In some embodiments, the barrier 45 may be omitted. The barrier 45 may be connected to various positions along the length of the arm 40, such as but not limited to a position at or near a distal end of the arm 40 as shown in the figures.

Figure 15:
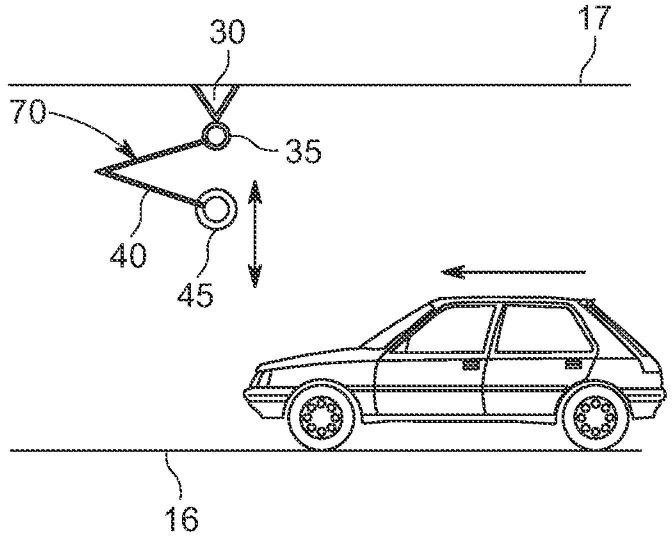
FIG. 15 is a side view of a vehicle barrier gate system utilizing a single scissor joint with the gate in the raised position in accordance with an example embodiment.
Figure 16:
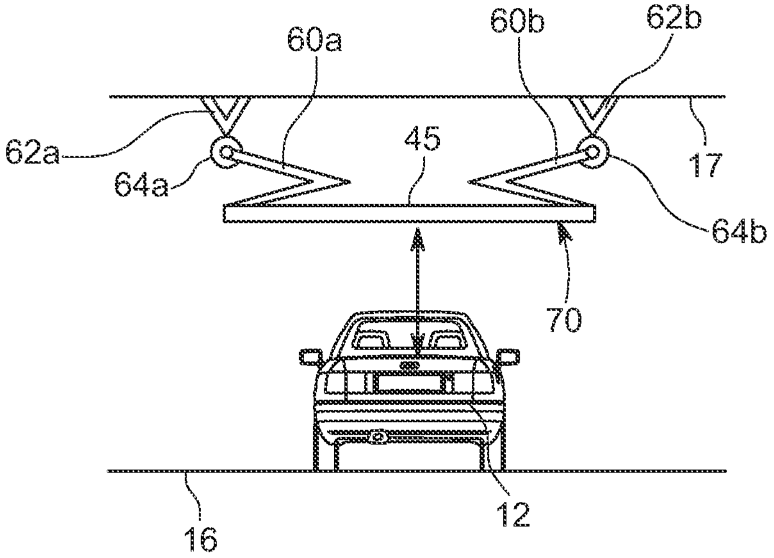
FIG. 16 is a front end view of a vehicle barrier gate system utilizing an inwardly-pivoting double scissor joint with the gates in the raised position in accordance with an example embodiment.
Figure 17:
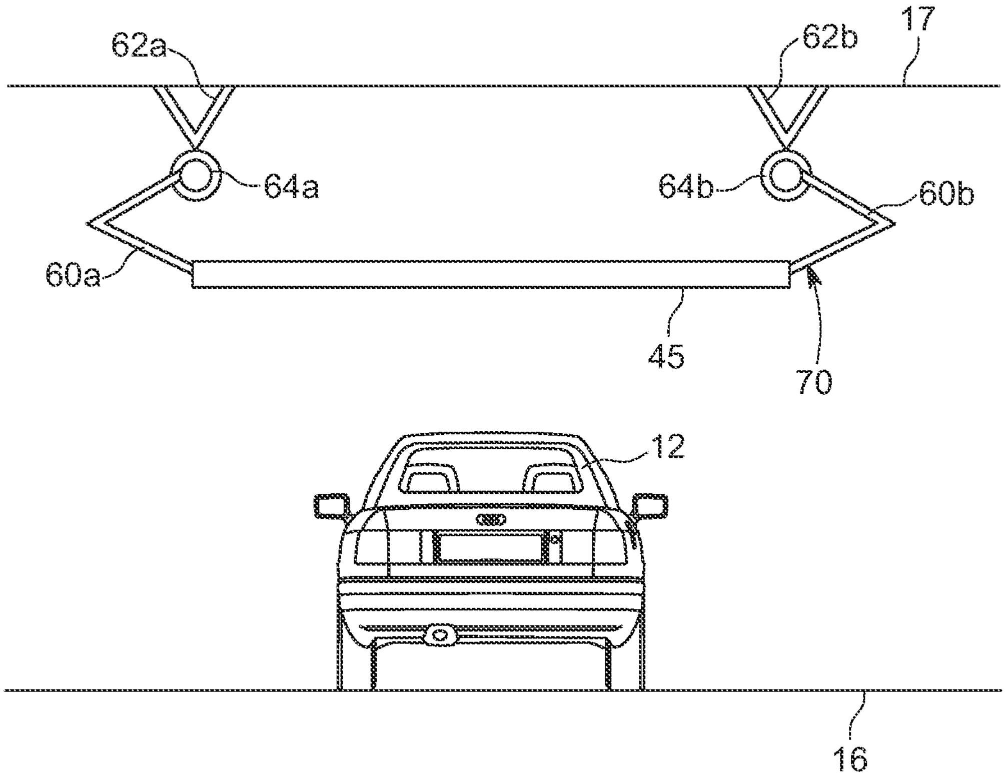
FIG. 17 is a front end view of a vehicle barrier gate system utilizing an outwardly-pivoting double scissor joint with the gate in the raised position in accordance with an example embodiment.

As shown throughout the figures, the arm 40 will generally comprise an elongated member such as a pole, rod, post, beam, or the like. In some embodiments, the arm 40 may be omitted and replaced by a cable, rope, cord, or the like. The arm 40 may in some embodiments be rigid, semi-rigid, or flexible. The arm 40 may include its own joints such that the arm 40 may collapse outwardly or inwardly upon itself as shown in FIGS. 15-17.

Figure 3:
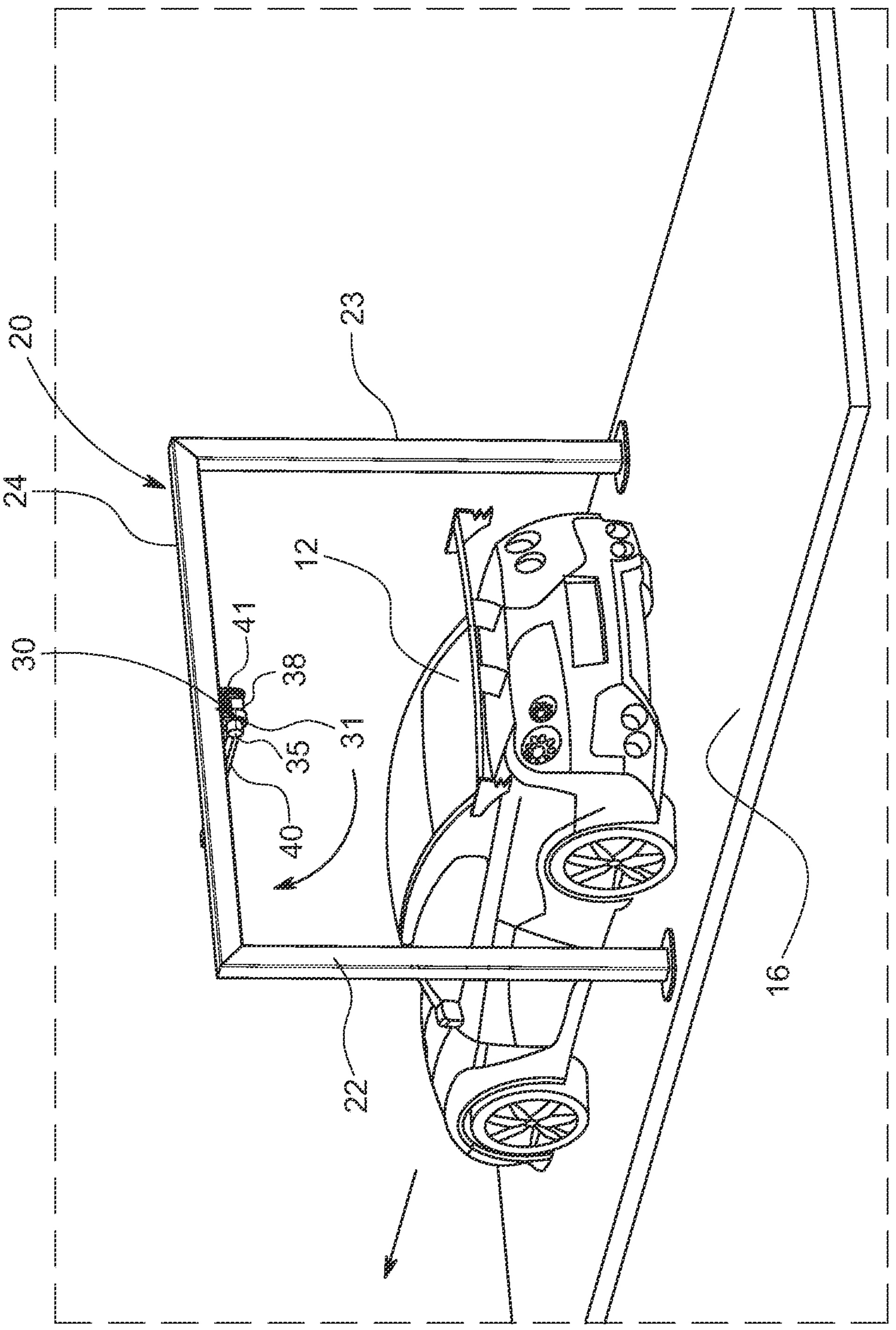
FIG. 3 is a perspective view of a vehicle barrier gate system illustrating a vehicle passing under the vehicle barrier gate system with the gate in the raised position in accordance with an example embodiment.
Figure 4:
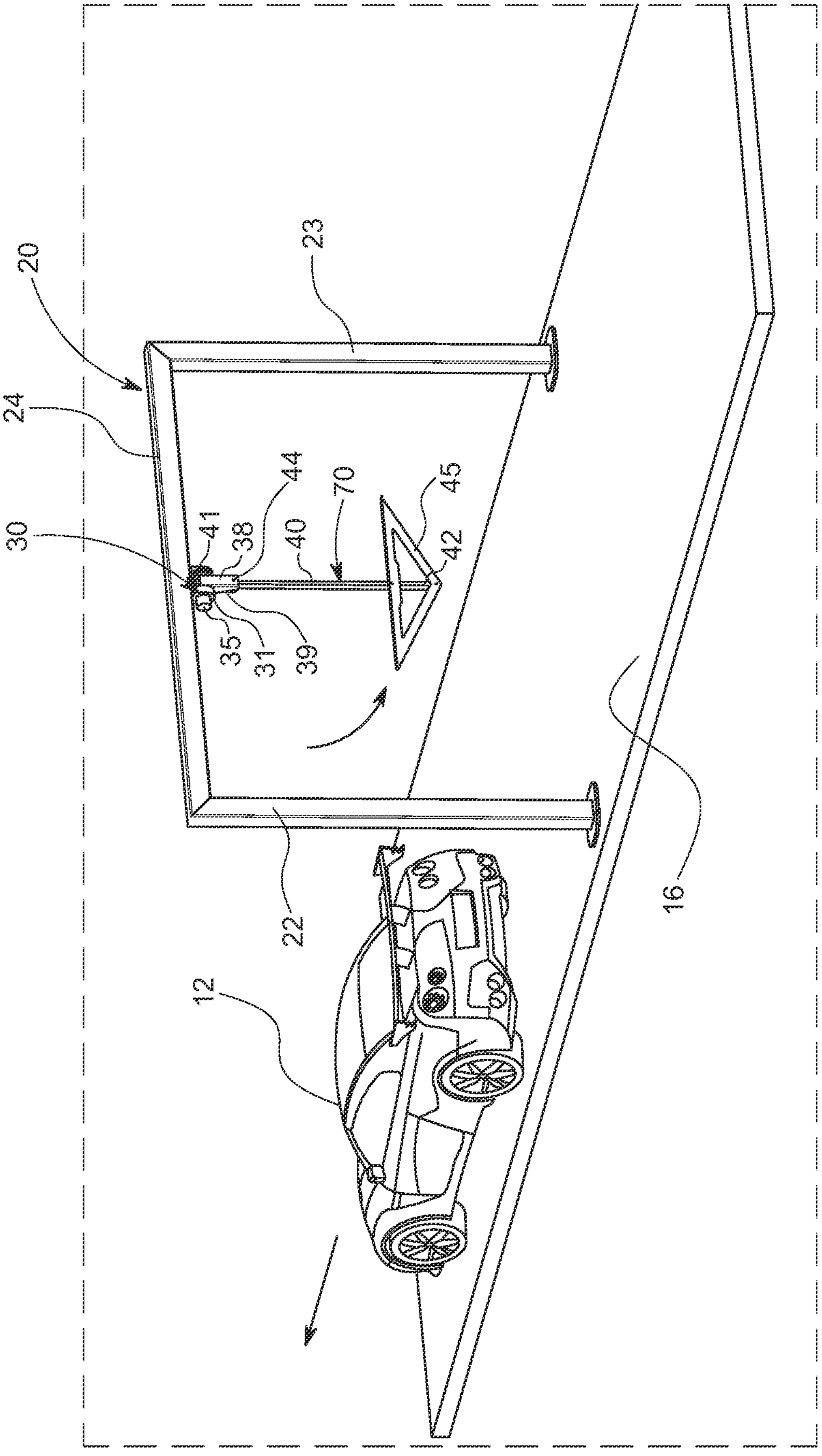
FIG. 4 is a perspective view of a vehicle barrier gate system illustrating a vehicle departing the vehicle barrier gate system with the gate in the lowered position in accordance with an example embodiment.

The gate 70 may extend downwardly from an overhead point (e.g., perpendicular to a roadway 16) such as a ceiling 17 or overhead support structure 20 when the gate 70 is in the lowered position such as shown throughout the figures. The gate 70 may extend horizontally (e.g., parallel to a roadway 16) or angularly from a ceiling 17 or overhead structure 20 when the gate 70 is in the raised position such as shown in FIGS. 3 and 19B. Alternatively as shown in FIGS. 13 and 14, the gate 70 may still extend downwardly when in the raised position, but with the lower end 42 of the arm 40 being raised to allow passage of a vehicle 12 thereunder.

As shown throughout the figures, the arm 40 may include an upper end 41 and a lower end 42. The upper end 41 of the arm 40 may be movably connected to a ceiling 17 or overhead support structure 20, such as by being movably connected to a mounting bracket 31 which is itself connected to the ceiling 17 or overhead support structure 20. The upper end 41 of the arm 40 may be pivotable with respect to the ceiling 17 or overhead support structure 20, such as by being pivotably connected to a mounting bracket 31 connected to the ceiling 17 or overhead support structure 20.

In some embodiments, a barrier 45 may be connected to the arm 40. However, in certain embodiments, the barrier 45 may be omitted, with the arm 40 alone functioning as the gate 70 to prevent or allow passage of a vehicle 12. In the exemplary embodiments shown throughout the figures, the barrier 45 is connected at or near the lower end 42 of the arm 40. However, in some embodiments, the barrier 45 may be connected at various other points between the upper and lower ends 41, 42 of the arm 40.

Figure 18:
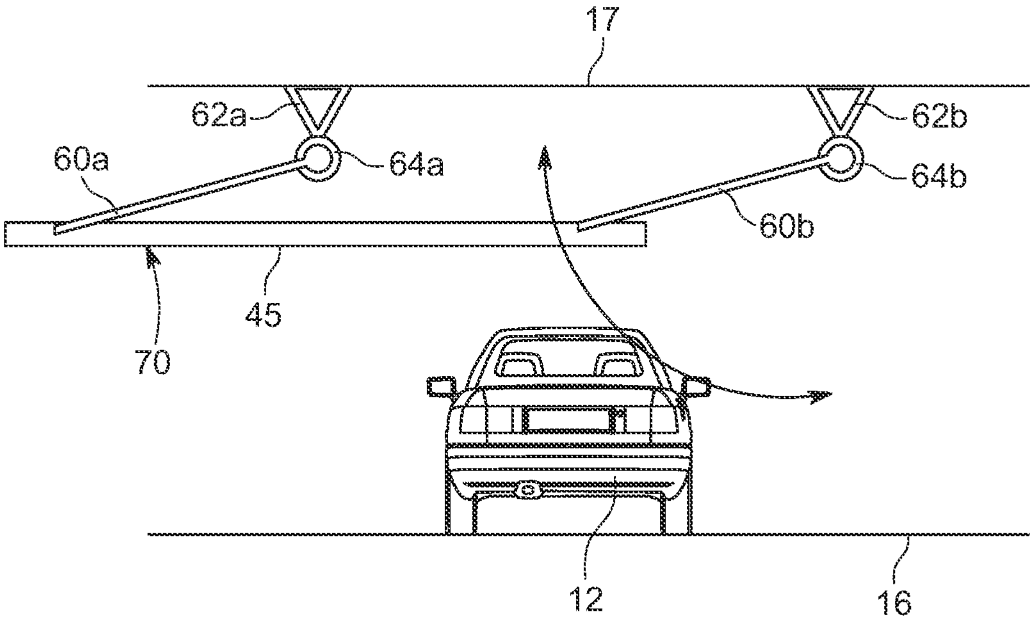
FIG. 18 is a front end view of a vehicle barrier gate system utilizing a pair of pivoting arms with the gate in the raised position in accordance with an example embodiment.

The type of barrier 45 utilized may vary in different embodiments. In the embodiments shown in FIGS. 1-6, it can be seen that a triangular-shaped barrier 45 is illustrated. Such an embodiment is merely for illustrative, exemplary purposes, and should not be construed as limiting in scope. Various types of barriers 45 may be utilized, including but not limited to rectangular-, square-, and circular-shaped barriers 45. FIGS. 16-18 illustrate embodiments in which a rectangular barrier 45 is utilized.

The barrier 45 may take many forms in different embodiments, provided the weight is suitable for the lifting mechanism 30. The form of the barrier 45 could be tailored to site requirements, with options including a standard full width horizontal bar, partial width horizontal bar, "Give Way" or "Stop" symbols or signs, or the like. In some embodiments, indicia such as lighting may be utilized with the barrier 45 (e.g., the barrier 45 could have a light that transitions between on/off or green/red to indicate if a vehicle 12 may pass).

The barrier 45 may be connected transverse to the arm 40, such as at a right angle (i.e., perpendicularly). The size and orientation of the barrier 45 may vary to suit different applications, such as different types of vehicles 12 or different types of roadways 16. For example, a barrier 45 covering a single lane may be narrower than a barrier 45 covering multiple lanes. The distance from the barrier 45 to the roadway 16 (i.e., the height of the barrier 45) may also vary, and should not be construed as limited by the exemplary embodiments shown in the figures.

As shown in FIGS. 8A-8D and 12A-12D, the gate 70 may include a magnetic element 43 such as a metallic material for alternatively engaging with the magnet 33 of the anchoring bracket 32 and/or the magnet 39 of the pivoting bracket 38. As previously mentioned, the magnetic element 43 may simply comprise a magnetic material such as various metals including iron. In other embodiments, the magnetic element 43 may comprise an electromagnet, permanent magnet, or temporary magnet. In such embodiments, the magnets 33, 39 may still comprise permanent or electromagnets, or alternatively may comprise a magnetic element such as a metallic material.

The magnetic element 43 of the gate 70 may be positioned at various locations along the height of the arm 40 between its upper and lower ends 41, 42. In the embodiment shown in the figures, the magnetic element 43 is positioned near the upper end 41 of the arm 40. The positioning of the magnetic element 43 on the arm 40 will generally be dependent on the length of the anchoring bracket 32 and the pivoting bracket so as to ensure that the magnetic element 43 of the gate 70 properly aligns with the magnets 33, 39 of the anchoring and pivoting brackets 32, 38.

In some embodiments, the magnetic element 43 may be integral with the gate 70 (e.g., integral with the arm 40 of the gate 70). In other embodiments, the magnet element may be connected to the gate 70, such as to the arm 40. In the exemplary embodiment shown in the figures, the arm 40 includes a cylindrical member to which a disc-shaped magnetic element 43 is connected. Various other configurations may be utilized, and thus the exemplary embodiment shown in the figures should not be construed as limiting in scope.

Generally, the magnetic element 43 of the gate 70 will function to removably connect the gate 70 to the pivoting bracket 38, with the pivoting bracket 38 being pivoted by function of the actuator 35. Thus, the magnetic element 43 of the gate 70 will magnetically engage with the corresponding magnet 39 of the pivoting bracket 38 such that the gate 70 is secured against the pivoting bracket 38. In the event that the gate 70 needs to be manually lifted independent of the pivoting bracket 38 (e.g., if the actuator 35 fails to function), or in the event that a vehicle 12 crashes through the gate 70 prior to the gate 70 raising all of the way, the magnet 39 and magnetic element 43 will disengage, allowing the gate 70 to freely pivot independent of the pivoting bracket 38. Such a breakaway mechanism prevents damage to the gate 70 in such situations.

The magnetic element 43 of the gate 70 will also function to secure the gate 70 in the raised position by magnetically engaging with a corresponding magnet 33 on the anchoring bracket 32 such as shown in FIG. 12C. When the gate 70 is in the raised position, the magnetic element 43 of the gate 70 will magnetically engage with the magnet 33 of the anchoring bracket 32 such that the gate 70 is retained in the raised position. While the actuator 35 will generally function to maintain gate 70 in the raised position, in some situations in which the actuator 35 has failed to function and the gate 70 needs to be manually raised, the magnetic engagement will maintain the gate 70 in the raised position until the arm 40 is pulled back down.

E. Control Unit/Authorization System

Figure 20:
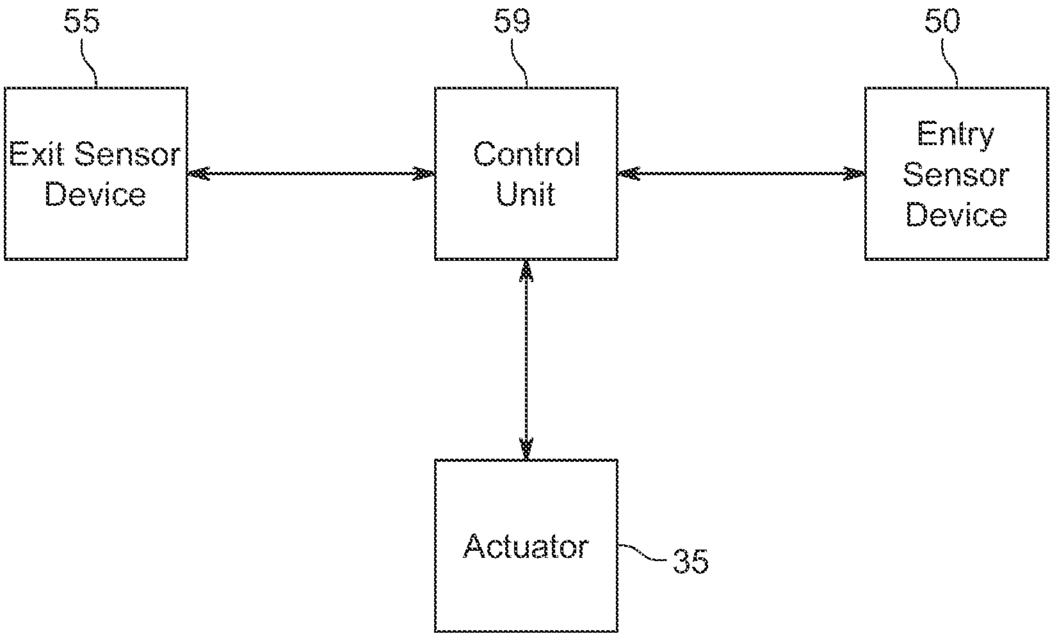
FIG. 20 is a block diagram of a vehicle barrier gate system in accordance with an example embodiment.

As best shown in FIG. 20, a control unit 59 may be utilized to control the actuator 35 and thus control the raising and lowering of the gate 70. The control unit 59 is generally in communication with the actuator 35 so as to control the actuator 35. The control unit 59 may be integrated with the actuator 35, may be directly connected to the actuator 35 (e.g., through the use of cables or wires), or may be remotely connected to the actuator 35 (e.g., through the use of wireless communications such as radio frequency waves, Wi-Fi, and the like).

The control unit 59 may comprise a computing device such as a computer, microcontroller, programmable logic circuit, integrated circuit, or the like. The control unit 59 may be positioned off-site or may be positioned on-site with the actuator 35. The control unit 59 may be in contact or integral with the actuator 35, or may be distally positioned away from the actuator 35. In embodiments utilizing multiple actuators 35 and multiple gates 70, a single control unit 59 may control all of the actuators 35, or each actuator 35 may have its own control unit 59.

Figure 22:
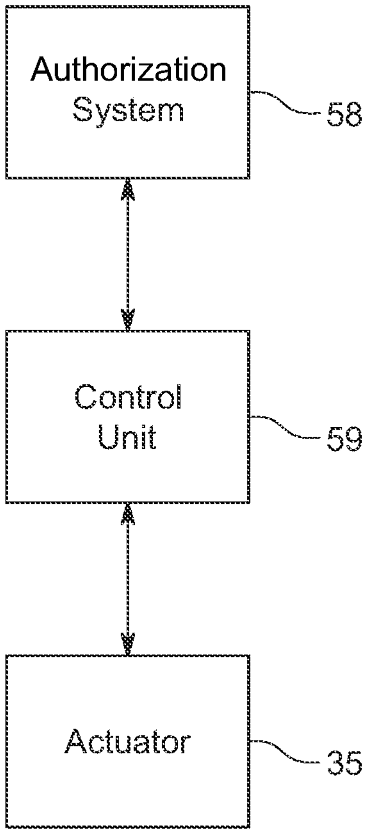
FIG. 22 is a block diagram of a vehicle barrier gate system in accordance with an example embodiment.
Figure 23:
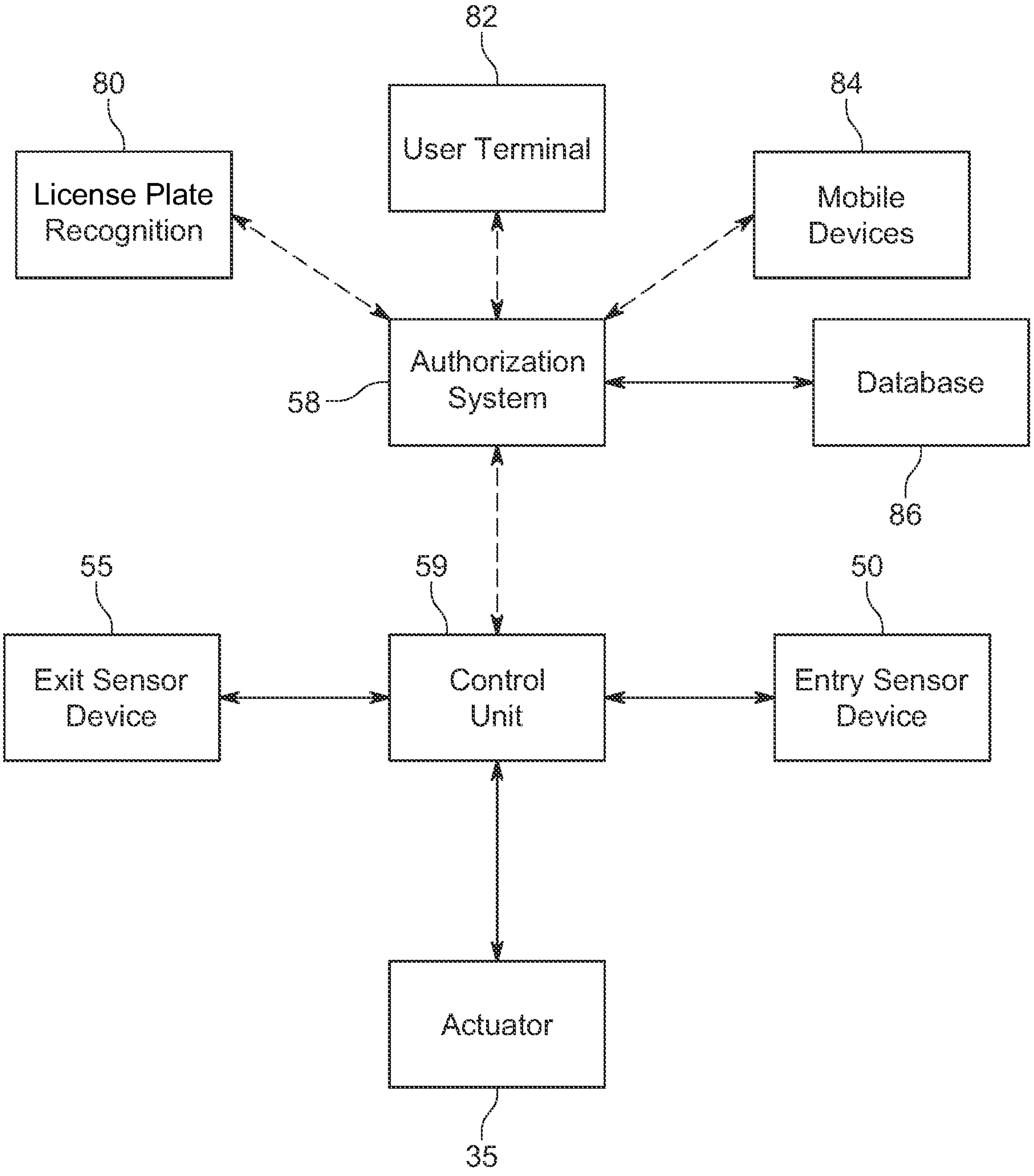
FIG. 23 is a block diagram of a vehicle barrier gate system including an authorization system in accordance with an example embodiment.

In an exemplary embodiment, the control unit 59 may be integrated with or in communication with (e.g., communicatively interconnected with) an authorization system 58 that provides authority for vehicles to pass, that may include an interface such as a user terminal 82 as shown in FIGS. 21-23, either directly or via a greater system. The authorization system 58 may be integrated into the user terminal 82 or stand alone. The authorization system 58 may comprise a computing device or system including a processor and memory capable of processing data from interconnected sensors 50, 55 (e.g., license plate recognition 80), user terminals 82, and/or mobile devices 84.

FIG. 23 illustrates an exemplary embodiment utilizing an authorization system 58 in communication (either by direct or indirect connection) with various devices and systems for providing authorization for a vehicle 12 to pass. As shown in FIG. 23, license plate recognition 80 may be utilized in which the authorization system 58 is adapted to authorize passage, and thus direct the gate 70 to open, upon detection of an authorized license plate or other identifying feature on a vehicle 12 approaching the gate 70.

Additionally or alternatively, a user terminal 82 may be utilized as previously discussed, in which a user may enter information (e.g., an access code), provide payment (e.g., through use of a credit card or mobile device 84), show evidence of authorization (e.g., through use of an RFID card or badge), or the like. The user terminal 82 may comprise various types of scanners or readers known in the art to control access to an area, such as but not limited to a card reader. For example, the user terminal 82 may comprise a free-standing structure including a scanner configured to read a payment card (e.g., a credit or debit card), an RFID access card or badge, a touch screen user interface panel (e.g., through which a user may enter an access code), and the like. In some embodiments, a mobile device 84 unique to each user may be utilized such as, for example, by scanning the mobile device 84 with the user terminal 82 or by detecting the mobile device 84.

Continuing to reference FIG. 23, it can be seen that a database 86 may be in communication with the authorization system 58. The database 86 may be integrated with the authorization system 58, or the authorization may be in communication with a remote database 86 (e.g., through the cloud). The database 86 may store various information needed for use by the authorization system 58 such as, for example, a listing of license plates that are authorized to pass through the gate 70.

When the authorization system 58 successfully verifies a payment, an entered access code, or other methods of authorization/verification, the authorization system 58 directs the control unit 59 to activate the actuator 35 to raise the gate 70 into the raised position. After a certain amount of time, or upon an indication that the vehicle 12 has departed (e.g., if the vehicle 12 has been sensed as having passed through), the control unit 59 will again activate the actuator 35 to lower the gate 70 back into the lowered position.

In some embodiments, the user may use a mobile device 84 such as a smart phone, smart watch, tablet, computer, or the like to transmit a signal to the control unit 59 (directly or indirectly via the authorization system 58) to prove authorization of their vehicle 12 to pass. In other embodiments, the user may be directed to enter their license plate information, either via a user terminal 82 or via a personal, mobile device.

F. Sensor(s)

Figure 19A:
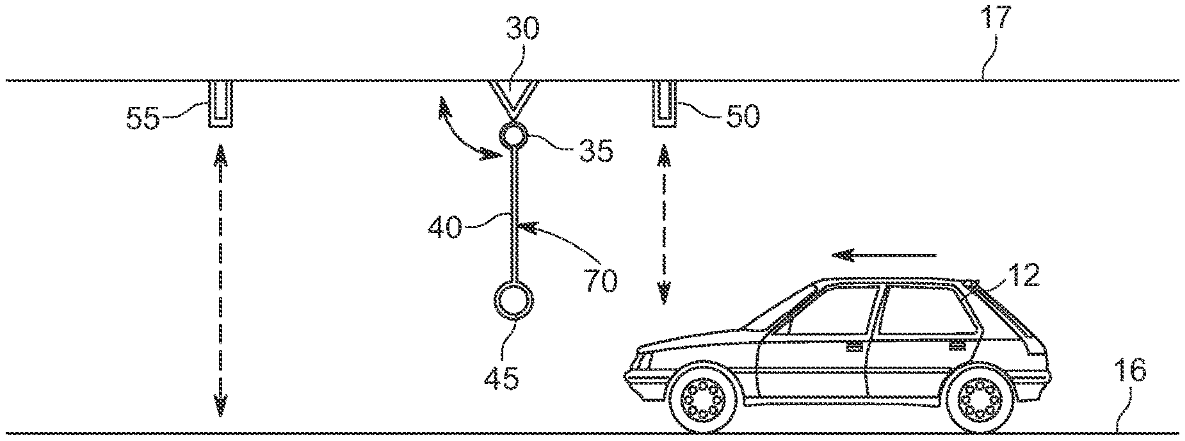
FIG. 19A is a side view of a vehicle barrier gate system utilizing an entry sensor and an exit sensor illustrating a vehicle approaching a gate in the lowered position in accordance with an example embodiment.
Figure 19B:
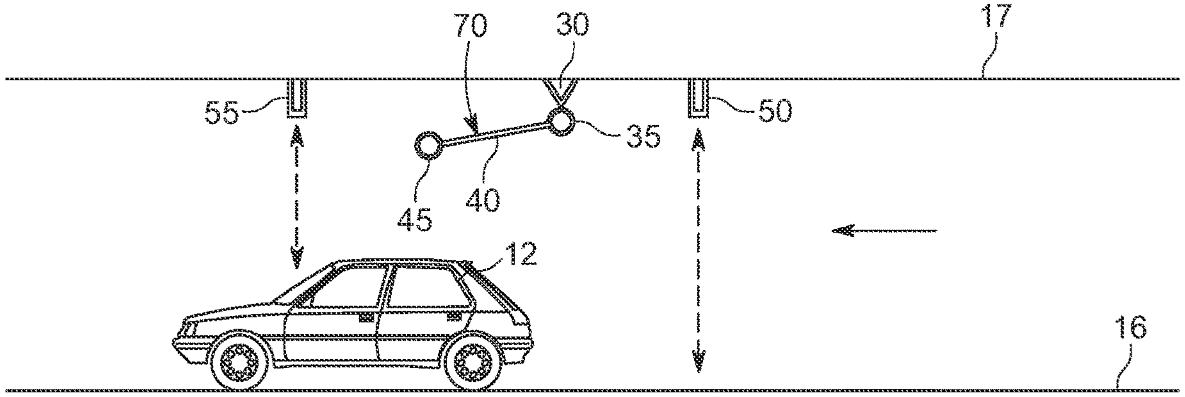
FIG. 19B is a side view of a vehicle barrier gate system utilizing an entry sensor and an exit sensor illustrating a vehicle passing under the gate in the raised position in accordance with an example embodiment.
Figure 19C:
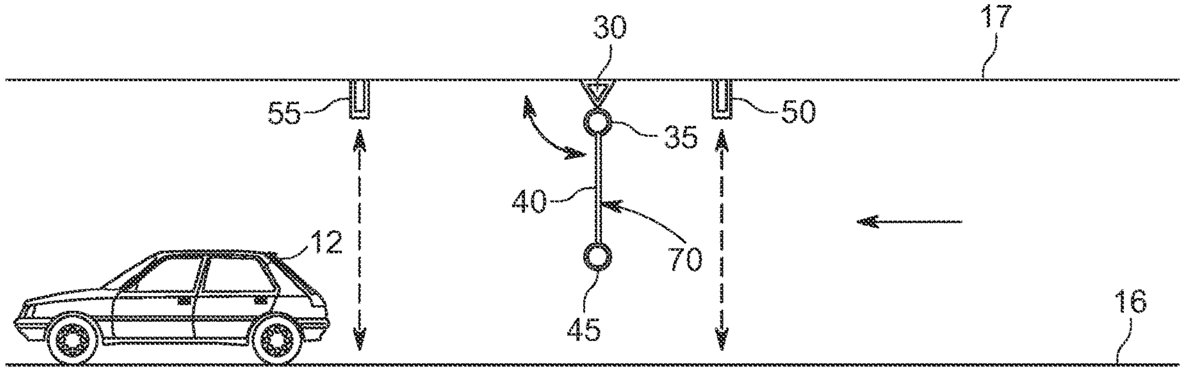
FIG. 19C is a side view of a vehicle barrier gate system utilizing an entry sensor and an exit sensor illustrating a vehicle departing the gate in the lowered position in accordance with an example embodiment.

In another exemplary embodiment such as shown in FIGS. 19A-19C, one or more sensors 50, 55 may be utilized to automatically detect a vehicle 12 approaching or departing the gate 70. Any such sensors 50, 55 will generally be in communication with the control unit 59 through either a direct connection or an indirect connection. Such sensors 50, 55 may aid the control unit 59 with operational timing of the gate 70 in the case of an external authorization input (e.g., use of a user terminal 82). However, in certain embodiments or situations, external authorization may not be required at all. In such cases, the control unit 59 may direct the gate 70 to be opened upon the sensors 50, 55 detecting a vehicle 12 approaching without the need for any specific authorization. In such embodiments, the authorization system 58 may be omitted or disabled as-needed.

In a first exemplary embodiment, a single sensor 50 may be utilized for both detecting arriving and departing vehicles 12. In other exemplary embodiments, an entry sensor 50 may be utilized for detecting arriving vehicles 12 and an exit sensor 55 may be utilized for detecting departing vehicles 12.

The one or more sensors 50, 55 will generally be positioned above the roadway 16 in an overhead position such as shown in FIGS. 19A-19C. Previously, such sensors 50, 55 have instead been positioned on the roadway 16, or next to the roadway 16. By positioning the sensor(s) 50, 55 in an overhead position, inadvertent damage may be avoided, such as in the case of vehicles 12 crashing into sensors 50, 55 which are positioned instead on or near the roadway 16.

As shown in FIGS. 19A-19C, the one or more sensors 50, 55 may be connected to a ceiling 17 above the roadway 16. In some embodiments, the sensors 50, 55 may be connected to the overhead support structure 20. The sensors 50, 55 will generally be in communication with (e.g., communicatively interconnected with) the control unit 59 so as to communicate to the control unit 59 when a vehicle 12 is detected approaching or departing the gate 70.

The positioning and orientation of the sensors 50, 55 may vary in different embodiments. In some embodiments, the sensors 50, 55 may be oriented downwardly (e.g., vertically). In other embodiments, the sensors 50, 55 may be oriented at a downward angle (e.g., diagonally). The sensors 50, 55 may be positioned adjacent to the mounting bracket 31 or be connected to the mounting bracket 31, anchoring bracket 32, or other structures/devices of the lifting mechanism 30.

The sensors 50, 55 may in other embodiments be distally positioned away from the lifting mechanism 30, such as on the ceiling 17 or on the overhead support structure 20. In the embodiment shown in FIGS. 19A-19C, it can be seen that an entry sensor 50 is positioned above the roadway 16 on a first side of the arm 40 and that an exit sensor 55 is positioned above the roadway 16 on a second side of the gate 70. Various other positioning of the sensors 50, 55 may be utilized.

While the figures illustrate discrete entry and exit sensors 50, 55, a single sensor 50 may be utilized to perform both functions in some embodiments. Such a single sensor 50 would be oriented to cover both the roadway 16 approaching the gate 70 and the roadway 16 departing the gate 70.

Various types of sensors 50, 55 may be utilized to achieve the sensing objectives, including binary sensors, "shape" sensors configured to detect shapes resembling vehicles, ranging sensors, and the like. In some embodiments, LIDAR sensors 50, 55 may be utilized. A singular sensor 50 may be utilized or multiple sensors 50, 55 (e.g., an entry sensor 50 and an exit sensor 55) may be utilized.

Binary sensors 50, 55 may simply trigger an on or off output (to the control unit 59) when a corresponding or tuned element is within the sensitivity range of the specific sensor 50, 55. A non-limiting example of a binary sensor 50, 55 may comprise an induction loop that sets an output when the vehicle 12 has approached the induction loop. Other binary sensors 50, 55 could include reflected light or magnetic-based proximity sensors 50, 55, as well as broken light beam type sensors 50, 55.

"Shape" sensors 50, 55 may be configured to recognize the shape of objects within the scope of the sensor 50, 55. A camera with appropriate image processing to recognize objects could be utilized as such a "shape" sensor 50, 55. Other technologies with comparable outcomes may include radar imaging or point cloud imaging, which uses multiple distance readings to form an image for further processing. All such "shape" sensors 50, 55, either individually or used in conjunction with other sensing elements, may be utilized to achieve the sensing objectives of an exemplary embodiment of the vehicle barrier gate system. Such sensors 50, 55 may also provide the added functionality of detecting or recognizing obstructions to the barrier 45 (e.g., if a person was in the path of the gate 70 such as the barrier 45 or arm 40).

Ranging sensors 50, 55 may utilize distance measurements and provide an output to the control unit 59 that reflects that distance. Such ranging sensors 50, 55 may include, without limitation, ultrasonic or light-based sensors 50, 55 (e.g., infrared, LIDAR, and the like). A singular ranging sensor 50, mounted overhead oriented on an angle down on the path of vehicle 12 travel, could be used to detect relevant vehicle 12 positioned based on a simple calculation of distance readings and the known position of the gate 70 relative to the location of the sensor 50. Other embodiments could utilize a pair of ranging sensors 50, 55 (e.g., LIDAR-based sensors 50, 55), in a more vertical orientation, with an entry sensor 50 positioned before the barrier 45 and an exit sensor 55 positioned after the barrier 45.

In some embodiments, the sensors 50, 55 may be configured to perform license plate recognition 80 in addition to their role of aiding gate 70 operation and control. Such license plate recognition 80 may be integrated into the existing sensors 50, 55, or may utilize separate, stand-alone sensors 50, 55. An exemplary embodiment of sensors 50, 55 which allow for license plate recognition is shown and described in U.S. Patent Publication No. 2021/0264779, covering a "Vehicle Identification System", the entire disclosure of which, except for any definitions, disclaimers, disavowals, and inconsistencies, is incorporated herein by reference.

In such embodiments, the sensors 50, 55 may comprise imaging devices such as cameras or the like which are adapted to detect not only the vehicle, but to also detect and identify the license plate (or other identifying characteristics) or each vehicle 12 approaching the gate 70. If the sensor 50, 55 detects a license plate or other identifying characteristic that confirms authorization of the vehicle 12 to pass, the control unit 59 will direct the actuator 35 to raise the gate 70 so that the vehicle 12 may pass.

In certain embodiments, separate authorization (e.g., through license plate recognition 80 or the like) may be omitted or disabled. In such embodiments, any vehicle 12 approaching the gate 70 may be permitted to pass without any separate authorization or payment. For example, the sensors 50, 55 may simply function to raise the gate 70 when a vehicle 12 approaches, and lower the gate 70 when a vehicle 12 departs (or after a set period of time). In other embodiments, the gate 70 may function without the need for sensors 50, 55 at all. In such embodiments, a push button, such as incorporated into the user terminal 82, may be utilized to raise the gate 70, with the gate 70 lowering itself after a preset amount of time sufficient to allow the vehicle 12 to pass.

G. Alternate Embodiments

FIGS. 13-18 illustrate various alternate embodiments of the vehicle barrier gate system. FIGS. 13 and 14 illustrate an embodiment of the vehicle barrier gate system in which the gate 70 is linearly-adjusted vertically between the raised and lowered positions. FIG. 15 illustrates an embodiment of the vehicle barrier gate system in which the gate 70 includes a pivoting scissor joint such that the gate 70 pivots at its approximate midpoint, with the barrier 45 being linearly-adjusted in a vertical manner.

FIG. 16 illustrates an embodiment of the vehicle barrier gate system in which a pair of arms 60*a*, 60*b* are utilized, with each of the arms 60*a*, 60*b* pivoting inwardly to raise a single barrier 45 which extends between the distal ends of each arm 60*a*, 60*b*. FIG. 17 illustrates an embodiment of the vehicle barrier gate system in which a pair of arms 60*a*, 60*b* are utilized, with each of the arms 60*a*, 60*b* pivoting outwardly to raise a single barrier 45 extending between the distal ends of each arm 60*a*, 60*b*. FIG. 18 illustrates an embodiment of the vehicle barrier gate system in which a pair of arms 60*a*, 60*b* pivot in a single direction to pivotably raise a single barrier 45 connected between the distal ends of each arm 60*a*, 60*b*.

With reference to the exemplary embodiment shown in FIGS. 13 and 14, it can be seen that a lifting mechanism 30 may be secured to a ceiling 17 above a roadway 16. An actuator 35, which may comprise a linear actuator such as a linear actuator, is utilized to raise and lower the gate 70 along a vertical, linear path between the raised and lowered positions. In such embodiments a winch may also be used to achieve a linear vertical path in which case, the gate 70 may include a cable, cord, rope, or the like as previously mentioned, rather than an arm 40.

With reference to the exemplary embodiment shown in FIG. 15, it can be seen that the arm 40 of the gate 70 is bisected into two discrete segments that are interconnected with each other by a pivoting scissor joint. The arm 40 may thus pivot in on itself (e.g., folding in on itself) to raise and lower the barrier 45 along a vertical, linear path between the raised and lowered positions.

With reference to the exemplary embodiment shown in FIG. 16, it can be seen that a first arm 60*a* is pivotably connected to a first bracket 62*a* by a first actuator 64*a* and a second arm 60*b* is pivotably connected to a second bracket 62*b* by a second actuator 64*b*. Each arm 60*a*, 60*b* is bisected by an inwardly-pivoting scissor joint. The arms 60*a*, 60*b* may thus pivot in on themselves to raise and lower the barrier 45 along a vertical, linear path between the raised and lowered positions.

With reference to the exemplary embodiment shown in FIG. 17, it can be seen that a first arm 60*a* is pivotably connected to a first bracket 62*a* by a first actuator 64*a* and a second arm 60*b* is pivotably connected to a second bracket 62*b* by a second actuator 64*b*. Each arm 60*a*, 60*b* is bisected by an outwardly-pivoting scissor joint. The arms 60*a*, 60*b* may thus pivot in on themselves to raise and lower the barrier 45 along a vertical, linear path between the raised and lowered positions.

With reference to the exemplary embodiment shown in FIG. 18, it can be seen that a first arm 60*a* is pivotably connected to a first bracket 62*a* by a first actuator 64*a* and a second arm 60*b* is pivotably connected to a second bracket 62*b* by a second actuator 64*b*. Each of the arms 60*a*, 60*b* pivots in a first direction (either to the right or the left of the roadway 16) so as to raise and lower the barrier 45 along an angular path between the raised and lowered positions.

H. Operation of Preferred Embodiment

In use, the vehicle barrier gate system may be configured such that the gate 70 is removed from the path of a vehicle 12 by moving the gate 70 up away from the roadway 16 allowing the vehicle 12 to travel underneath. This may be achieved by angular or linear motion, or a combination thereof in one or more planes. The direction of movement of the gate 70 may vary in different embodiments. By way of example and without limitation, the gate 70 may pivot towards the direction of travel of the vehicle 12, away from the direction of travel of the vehicle 12, or transverse to the direction of travel of the vehicle 12 (e.g., side-to-side). As a further non-limiting example, the gate 70 may be linearly-adjustable along a vertical path upwardly into the raised position and downwardly into the lowered position. Such movements can be realized through the use of various types of actuators 35, such as but not limited to linear actuators, motors, and/or winches.

In the case of linear motion such as shown in FIGS. 13 and 14, a variety of methods may be utilized to achieve a linear path between the raised and lowered positions. By way of example and without limitation, the gate 70 may be actuated away from the ground using a linear actuator 35, a winch actuator 35, or similar methods using a direct connection to the gate 70.

Alternatively as shown in FIGS. 15-17, pivoting joints on the arm(s) 40, 60*a*, 60*b* may be utilized to achieve the same linear motion of the gate 70 between the raised and lowered positions. A non-limiting example would be the use of a scissor joint in the one or more arms 40, 60*a*, 60*b*. Such pivoting joints may be actuated in any plane using appropriate methods with one or more overhead mounting brackets 31, 62*a*, 62*b*.

Similarly, angular motion of the gate 70 may also be achieved directly or with the use of pivoting joints or mechanisms. Parallel arms 60*a*, 60*b* may be utilized such as shown in FIGS. 15-18, whereby pivoting joints can be used to remove the gate 70 from the path of the vehicle 12. In such embodiments, space to the side of the vehicle 12 may be required for the angular path of the gate 70. However, embodiments in which parallel arms 60*a*, 60*b* are utilized may also be implemented in another plane, such as that in line with the direction of vehicle 12 travel, to reduce the amount of sideways space needed for clearance. Furthermore, in some embodiments, the arm(s) 40, 60*a*, 60*b* may be comprised of a cable, with the gate 70 functioning as a swing.

In other embodiments, angular motion may be applied to the gate 70, with the gate being pivoted up and out of the path of the vehicle 12. Generally, the pivoting path of the gate 70 will be in the same plane as the direction of travel of the vehicle such as shown in FIGS. 19A-19C. However, in some embodiments, the opposite arrangement may be utilized.

Embodiments utilizing a gate 70 with an angular motion could utilize an actuator 35 comprised of a geared motor or a motor with external gearing, or some combination thereof. However, other embodiments could utilize a linear actuator 35 or winch actuator 35 to pull the gate 70 up on an angular path, either with the barrier 45 mounted on a rigid arm 40 or a semi-rigid or flexible arm 40 such as various types of cables.

The overhead mounting of the lifting mechanism 30 shown in the figures is representative of an appropriate overhead mount. However, the exact mounting arrangement will depend on the installation scenario, such as but not limited to the ceiling 17 clearance and the height of vehicles 12 expected to pass through the barrier 45. With suitable ceiling 17 height, the lifting mechanism 30 and/or gate 70 may be simply mounted directly to the ceiling 17 such as shown in FIGS. 13-19C and 21.

Where there is a higher ceiling 17, the lifting mechanism 30 and/or gate 70 may be lowered to a more appropriate height using suitable methods, or attached to existing infrastructure such as cable racks, lighting systems, and the like. If the gate 70 were to be installed outdoors, the lifting mechanism 30 may be mounted to a gantry, sign boards, or the like to achieve the desired overhead positioning. In some embodiments, a discrete overhead support structure 20 may be utilized such as shown in FIGS. 1-6.

The lifting mechanism 30 may be triggered (i.e., activated) using various methods. In an example embodiment, a simple activation (e.g., push button to raise and lower) may be utilized. In other embodiments, an activation and timer may be utilized (e.g., the gate 70 is lowered after a preset amount of time after a vehicle 12 passes thereunder).

In the embodiment shown in FIGS. 19A-19C, the lifting mechanism 30 may be coupled with one or more overhead sensors 50, 55. Utilizing sensors 50, 55 which are installed overhead reduces complexity of installation and cost, as well as opening up more reliable alternatives compared to conventional ground-mounted sensors 50, 55.

The one or more sensors 50, 55 function to provide information when a vehicle 12 is approaching the gate 70. Additionally, after the gate 70 has been raised, the sensor(s) 50, 55 function to provide information regarding when the vehicle 12 has departed the gate 70 pathway so that the gate 70 can be lowered without impacting the vehicle 12.

FIGS. 19A-19C illustrate the usage of a pair of sensors 50, 55 comprising an entry sensor 50 and an exit sensor 55 being used in connection with a gate 70 having an angular path. FIGS. 19A and 19C illustrate the gate 70 in the lowered, obstructing position. As a vehicle 12 approaches such as shown in FIG. 19B, the entry sensor 50 detects the presence of the vehicle 12 and communicates the same to the control unit 59, such as using a communication network, radio waves, or the like. However, in some embodiments, the control unit 59 may have a direct communication link with the sensors 50, 55.

In some embodiments, the control unit 59 may be connected to an authorization system 58 either locally or via an extended network. An example of such an authorization system 58 would be a system for monitoring parking permissions and payments in the appropriate parking area. Permission/authorization assessment may incorporate license plate data using license plate recognition (LPR) as the vehicle 12 approaches. LPR detection may be implemented stand-alone or integrated with one or more sensors 50, 55 used for the operation of the gate 70.

Such a greater system may also incorporate compatible portable devices such as mobile devices 84 or applications that vehicle 12 operators may use to obtain permission or make payments for access. In some embodiments, a discrete user terminal 82 may be utilized. As part of the authorization system 58, the control unit 59 may confirm permission for the vehicle 12 to pass upon first sensing, or prior permission may have been obtained (i.e., the next sensed vehicle 12 is allowed to pass through).

Once the control unit 59 determines that the gate 70 requires opening into the raised position, it may direct or control the actuator 35 to move the gate 70 up and out of the obstructing path of the vehicle 12. Once the vehicle 12 is free from the path of the gate 70, such as by being detected by an exit sensor 55, the control unit 59 may direct or control the actuator 35 to once again lower the gate 70 to its obstructing, lowered position awaiting approach of the next vehicle 12. In some embodiments, however, the control unit 59 may direct the gate 70 to remain in the raised position to allow the next vehicle 12 to pass.

In some embodiments in which a gate 70 is positioned across a multi-lane roadway with opposing directions of travel, the lifting mechanism 30 may function to raise the gate in both directions (e.g., pivoting the gate 70 in a first direction for a vehicle 12 traveling in the first direction and pivoting the gate 70 in a second direction for a vehicle 12 traveling in the second direction).

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. A vehicle barrier gate system, comprising:

a lifting mechanism having a gate suspended from a pivotable arm, wherein the lifting mechanism is connected to a ceiling or an overhead support structure, and wherein vehicles are capable of passing under the ceiling or the overhead support structure; and a control unit in communication with the lifting mechanism, wherein the control unit directs the lifting mechanism to move the gate between a lowered position where the gate prevents passage of the vehicle and a raised position where the gate allows passage of the vehicle.

2. The vehicle barrier gate system of claim 1, further comprising one or more sensors in communication with the control unit.

3. The vehicle barrier gate system of claim 2, wherein at least one of the sensors comprises an entry sensor that detects the vehicle approaching the gate and wherein, responsive to detection of the vehicle approaching the gate by the entry sensor, the control unit directs the lifting mechanism to move the gate into the raised position.

4. The vehicle barrier gate system of claim 2, wherein at least one of the sensors comprises an exit sensor that the detects the vehicle having passed under the gate and wherein, responsive to detection of the vehicle having passed under by the gate by the exit sensor, the control unit directs the lifting mechanism to move the gate into the lowered position.

5. The vehicle barrier gate system of claim 2, wherein a single one of the sensors functions as both an entry sensor that detects the vehicle approaching the gate and an exit sensor that detector the vehicle having passed under the gate, wherein responsive to detection of the vehicle approaching the gate by the single sensor, the control unit directs the lifting mechanism to move the gate into the raised position, and wherein responsive to detection of the vehicle having passed under by the gate by the exit sensor, the control unit directs the lifting mechanism to move the gate into the lowered position.

6. The vehicle barrier gate system of claim 2, wherein the one or more sensors are positioned on the ceiling or overhead support structure.

7. The vehicle barrier gate system of claim 2, wherein at least one of the one or more sensors comprises a binary sensor.

8. The vehicle barrier gate system of claim 2, wherein at least one of the one or more sensors comprises a shape sensor.

9. The vehicle barrier gate system of claim 2, wherein at least one of the one or more sensors comprises a ranging sensor.

10. The vehicle barrier gate system of claim 2, wherein at least one of the one or more sensors performs license plate recognition.

11. The vehicle barrier gate system of claim 10, wherein the at least one of the one or more sensors comprises a camera.

12. The vehicle barrier gate system of claim 2, wherein the lifting mechanism additionally includes: (a) a bracket, wherein the gate is movably connected to the bracket and wherein the bracket is connected to the ceiling or the overhead support structure; (b) a pivoting bracket that is connected to the gate; and (c) an actuator connected to the pivoting bracket, wherein the actuator pivots the pivoting bracket to move the gate between the lowered position and the raised position.

13. The vehicle barrier gate system of claim 12, wherein the actuator is comprised of a linear actuator, and wherein the gate is moved along a vertical path into the raised position and lowered along the vertical path into the lowered position.

14. The vehicle barrier gate system of claim 12, wherein the actuator is comprised of a motor, and wherein the motor is adapted to rotate such that the gate is adapted to pivot between the raised position and the lowered position.

15. The vehicle barrier gate system of claim 12, further comprising a guide member rotatably connected to the bracket, wherein the guide member includes an axle, and wherein the gate is connected to the axle of the guide member.

16. The vehicle barrier gate system of claim 12, wherein the gate breaks away from the pivoting bracket responsive to a vehicle impacting the gate in the lowered position.

17. The vehicle barrier gate system of claim 1, wherein the lifting mechanism enables the gate to move linearly.

18. The vehicle barrier gate system of claim 1, wherein the lifting mechanism enables the gate to move angularly.

19. The vehicle barrier gate system of claim 1, wherein the lifting mechanism enables to the gate to move both linearly and angularly.

20. The vehicle barrier gate system of claim 1, wherein the lifting mechanism is capable of moving the gate in a first direction and of moving the gate in a second direction that is opposite the first direction.

* * * * *